United States Patent
Robertson et al.

(10) Patent No.: US 6,216,123 B1
(45) Date of Patent: Apr. 10, 2001

(54) METHOD AND SYSTEM FOR RAPID RETRIEVAL IN A FULL TEXT INDEXING SYSTEM

(75) Inventors: David O. Robertson, Provo; Ronald P. Millett; John P. Pratt, both of Orem; Bruce Tietjen, Highland, all of UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/103,702

(22) Filed: Jun. 24, 1998

(51) Int. Cl.[7] .................................................. G06F 17/30
(52) U.S. Cl. ..................... 707/3; 707/1; 707/4; 704/231; 704/251
(58) Field of Search ................... 707/1, 3, 4, 5, 707/6, 101, 102, 103, 519; 271/263; 304/900; 395/759; 709/224; 704/231, 251; 400/70

(56) References Cited

U.S. PATENT DOCUMENTS

| | | | |
|---|---|---|---|
| 3,969,698 | * 7/1976 | Bollinger et al. | 340/146.3 |
| 4,243,216 | * 1/1981 | Mazumder | 271/263 |
| 4,318,184 | 3/1982 | Millett et al. . | |
| 4,749,989 | * 6/1988 | Carosso | 400/70 |
| 4,771,385 | 9/1988 | Egami et al. . | |
| 4,817,036 | 3/1989 | Millett et al. . | |
| 4,972,349 | 11/1990 | Kleinberger . | |
| 4,974,191 | * 11/1990 | Amirghodsi et al. | 364/900 |
| 4,991,087 | * 2/1991 | Burkowski et al. | 364/200 |
| 5,109,433 | 4/1992 | Notenboom . | |
| 5,153,831 | 10/1992 | Yianilos . | |
| 5,201,048 | 4/1993 | Coulter et al. . | |
| 5,224,038 | * 6/1993 | Bespalko | 364/419 |
| 5,251,129 | 10/1993 | Jacobs et al. . | |
| 5,297,038 | 3/1994 | Saito . | |
| 5,321,606 | 6/1994 | Kuruma et al. . | |
| 5,321,833 | 6/1994 | Chang et al. . | |
| 5,375,235 | 12/1994 | Berry et al. . | |
| 5,383,121 | 1/1995 | Letkeman . | |
| 5,412,807 | 5/1995 | Moreland . | |
| 5,544,051 | * 8/1996 | Senn et al. | 364/419 |
| 5,675,819 | * 10/1997 | Schuetze | 395/760 |
| 5,680,511 | * 10/1997 | Baker et al. | 395/2 |
| 5,682,539 | * 10/1997 | Conrad et al. | 395/759 |
| 5,701,459 | 12/1997 | Millett et al. . | |
| 5,717,912 | 2/1998 | Millett et al. . | |
| 5,752,051 | * 5/1998 | Cohen | 704/1 |
| 5,794,050 | * 8/1998 | Dahlgren et al. | 395/708 |
| 5,864,863 | * 1/1999 | Burrows | 707/103 |
| 5,873,076 | * 2/1999 | Barr et al. | 707/3 |
| 5,913,209 | * 6/1999 | Millett | 707/103 |
| 5,995,928 | * 11/1999 | Nguyen et al. | 704/251 |
| 6,021,409 | * 2/2000 | Burrows | 707/102 |
| 6,055,526 | * 4/2000 | Ambroziak | 707/2 |
| 6,067,541 | * 5/2000 | Raju et al. | 707/3 |
| 6,073,148 | * 6/2000 | Rowe et al. | 707/542 |
| 6,078,923 | * 6/2000 | Burrows | 707/101 |

OTHER PUBLICATIONS

"Models for Compression in Full–Text Retrieval Systems", Witten et al., Data Compression Conference 1991, IEEE, pp. 23–32.

(List continued on next page.)

Primary Examiner—Kim Vu
Assistant Examiner—Anh Ly
(74) Attorney, Agent, or Firm—Dinsmore & Shohl

(57) ABSTRACT

A method and system for generating and searching a full text index. The fill text index includes the use of word numbers and a minimum delta which minimizes the need to access document level information during the application of search operators. Word registers having coordinated document level and word level information, as well as relevance information are used in search operations. Word numbers are clustered together during sub-operations in preparation for the next operation in a search query. The fill text index according to the present invention is extremely efficient and greatly reduces table accesses and/or disk I/Os.

19 Claims, 13 Drawing Sheets

OTHER PUBLICATIONS

"Hierarchical Compression Method for Index Lists with Compressed Mode Boolean Operators", Ronald P. Millett, Jul. 26, 1991.

"Coding for Compression in Full–Text Retrieval Systems", Moffat et al., IEEE; Apr., 1992, pp. 72–81.

"Indexing and Compressing Full Text Databases for CD–ROM", Witten et al., Journal of Information Science; Dec. 1990.

"Search Term Relevance Weighting Given Little Relevance Information", K. Jones, Readings in Information Retrieval, pp. 329–338, 1997, also published in Journal of Documentation, vol. 35, No. 1, Mar. 1979, pp. 30–48.

"On relevance weights with little relevance information", Robertson, et al., Proceedings of the 20th Annual International ACM SIGIR Conference on Research and Development in Information Retrieval, pp. 16–24, Jul. 27–31, 1997.

* cited by examiner

| WORD | WORD NUM |
|---|---|
| RED | 1 |
| BLUE | 2 |
| GREEN | 3 |
| BLUE | 4 |
| PURPLE | 5 |
| YELLOW | 6 |
| BLACK | 7 |
| TAN | 8 |
| BROWN | 9 |
| GREEN | 10 |
| RED | 11 |
| BLUE | 12 |
| YELLOW | 13 |
| ORANGE | 14 |
| RED | 15 |
| ... | ... |
| PINK | 869 |

| WORD | WORD NUM |
|---|---|
| YELLOW | 1025 |
| BLUE | 1026 |
| RED | 1027 |
| YELLOW | 1028 |
| AQUA | 1029 |
| TAN | 1030 |
| FUCHSIA | 1031 |
| MAUVE | 1032 |
| BLUE | 1033 |
| ORANGE | 1034 |
| RED | 1035 |
| RED | 1036 |
| GREEN | 1037 |
| BLUE | 1038 |
| ... | ... |
| TAN | 1530 |

| WORD | WORD NUM |
|---|---|
| WHITE | 1793 |
| BLACK | 1794 |
| TAN | 1795 |
| YELLOW | 1796 |
| RED | 1797 |
| ORANGE | 1798 |
| ORANGE | 1799 |
| RED | 1800 |
| BLACK | 1801 |
| YELLOW | 1802 |
| GREEN | 1803 |
| PURPLE | 1804 |
| MAUVE | 1805 |
| ... | ... |
| AQUA | 2059 |
| ... | ... |
| BROWN | 2562 |

FIG. 1

| DOCUMENT NUMBER | DOCUMENT NAME | DOCUMENT LOCATION |
|---|---|---|
| 1 | FIRST.DOC | PATHNAME OR URL |
| 2 | COLORS.TXT | |
| 3 | APPT.WPD | |
| 4 | FOX.TXT | |
| 5 | APPTS.DOC | |
| ... | ... | |
| 999 | DOC999 | |

FIG. 2

| WORD | RELEVANCE | VIRTUAL WORD NUMBERS |
|---|---|---|
| AQUA | <DEFAULT> | 1029, 2059 |
| ... | | |
| BLACK | <DEFAULT> | 7, 1794, 1801 |
| BLACK | <TITLE> | 3012, 4296, 6964, 8923 |
| BLACK | <TITLE, ALL CAPS> | 6964, 8923 |
| ... | | |
| GREEN | <DEFAULT> | 3, 10, 1037, 1803 |
| ... | | |
| MAUVE | <DEFAULT> | 1032, 1805 |
| ZAPPA | <DEFAULT> | 740, 2400, 8919 |

FIG. 3

| ENTRY | DOC # | DOC. REC OFFSET | WORD NUMBERS |
|---|---|---|---|
| 1 | 1 | 0 | 1 - 256  *48* |
| 2 | 1 | 0 | 257 - 512 |
| 3 | 1 | 0 | 513 - 768 |
| 4 | 1 | 0 | 769 - 869  *50* |
| 5 | 2 | 4E | 1025 - 1280  *52* |
| 6 | 2 | 4E | 1281 - 1530 |
| 7 | 0 | NULL | NULL XREF ENTRY — *54* |
| 8 | 3 | 97 | 1793 - 2048  *56* |
| 9 | 3 | 97 | 2049 - 2304 |
| 10 | 3 | 97 | 2305 - 2560 |
| 11 | 3 | 97 | 2561 - 2562 |

| ENTRY | BOUNDARY INDICATOR |
|---|---|
| 1 | 1  *60* |
| 2 | 0 |
| 3 | 0 |
| 4 | 0 |
| 5 | 1  *62* |
| 6 | 0 |
| 7 | 0 |
| 8 | 1 |
| 9 | 0 |
| 10 | 0 |
| 11 | 0 |

METHOD AND SYSTEM FOR RAPID RETRIEVAL IN A FULL TEXT INDEXING SYSTEM

FIELD OF THE INVENTION

This invention relates generally to text indexing, and particularly to a full text index which quickly and efficiently processes search words.

BACKGROUND OF THE INVENTION

The ability to locate relevant documents from a large pool of documents is becoming increasingly desirable. Programs which provide this capability are commonly known as search engines. Search engines typically process a pool of documents and build an index of words. A user can enter a search request, or query, seeking a list of documents that contain certain words. The search engine processes the index and returns a list of documents that satisfy the request. Search engines are used frequently to determine which web sites on the Internet contain relevant content. Search engines are also used to access information from intranets, file servers, and databases. Given the vast amount of data that is electronically available, search engines are becoming increasingly important as a mechanism for finding relevant documents from a large pool of documents.

Efficiency is very important in search engine technology. While inefficient indexing and/or search processing may not be noticeable when the relevant pool of documents is relatively small, inefficiency will quickly lead to excessive index and search processing times when the pool of documents is relatively large. Efficiency is also an important consideration for other aspects of full text indexes, such as processing complex queries, or processing natural language queries. A search engine typically implements natural language searching by breaking a search request into multiple sub-queries. Consequently, if the searching algorithm is inefficient, response time can be seriously degraded.

A search request typically takes the form of one or more words separated by one or more operators, such as AND, OR, or NOT, and proximity restrictions, such as word A within 10 words of word B. The search engine determines which documents satisfy the request, and returns a list of such documents.

A large number of documents may fulfill the search request where the pool, or set, of indexed documents is large. To help the user determine which documents will most likely contain relevant content, many search engines provide a 'relevance' ranking for each document that fulfills the search request. The relevance ranking is an estimation provided by the search engine of the importance of the document in view of the particular search request. The ability to rank and present documents to a user in order of their relevance is becoming increasingly important to minimize the time a user must spend in determining which of the many documents that fulfill the search request are, in fact, relevant. Ranking documents by relevance adds additional complexity to the search engine, and presents another potential efficiency consideration. Ideally, the relevance determination will not add significantly to the overall response time of the search engine.

One of the best mechanisms for increasing the efficiency of a search engine is to minimize peripheral input/output (I/O) operations, and in-memory table accesses. A full text index is typically made up of several tables of information, including cross-reference information, and during a search request, many different tables are accessed to make pertinent determinations, including determining in what document a word is located. Full text indexes can be very large, and can take up hundreds of megabytes or more of space. Because of its size, an entire full text index typically will not fit in the memory of a computer, so a table index access will likely result in at least one I/O operation to disk, and, depending on the access methodology, can result in multiple I/Os. An I/O operation is an extremely time-consuming process. Moreover, a single search request may require hundreds of thousands of table accesses, depending on the commonality of the word. Since eliminating or reducing I/O operations can significantly reduce response time, it is beneficial to reduce table accesses. One mechanism for reducing table accesses would be to store word information in a manner that the information itself allows for document level determinations to be made without the need to access a separate document level table.

SUMMARY OF THE INVENTION

It is one object of the present invention to provide a method and system for quickly and efficiently processing search requests against a full text index.

It is another object of the present invention to provide a method and system for generating a full text index that enables very efficient document level access.

It is yet another object of the present invention to provide a method and system that enables document level determinations to be made from word level information.

It is yet another object of the present invention to provide a method and system for accessing a full text index that efficiently and quickly combines results of multiple sub-queries.

It is still another object of the present invention to provide a full text index that substantially reduces table access during search query processing.

It is still another object of the present invention to provide a method and system for making document relevance determinations quickly and efficiently.

Additional objects, advantages and novel features of the invention will be set forth in part in the description which follows, and in part will become apparent to those skilled in the art upon examination of the invention. The objects and advantages of the invention may be realized and attained by means of the instrumentalities and combinations particularly pointed out in the appended claims. To achieve the foregoing and other objects in accordance with the present invention, the method of the present invention includes generating a full text index of a plurality of documents by associating a group of word numbers with the words of a document. Each document has an initial word number and a final word number associated with it. The group of word numbers has a predetermined group size that is greater than one, and the initial word number associated with any document is at least the predetermined group size distance from the initial word number associated with any other document. The full text index includes a word list having a plurality of word entries. Each word entry includes the word, and a list of word numbers identifying where in the documents the word is located. A cross-reference table is generated that contains an entry for each group of word numbers. Each entry contains a reference to the document with which the group of word numbers has been associated.

According to the present invention, the words in a search request are converted to respective word numbers. The full text index is accessed to obtain lists of the word numbers associated with the words of the search request. The full text index of the present invention greatly simplifies and reduces the overhead involved in the determination of whether multiple search words exist in the same document. This simplification is achieved, in part, through the use of a predetermined group size, wherein word numbers that exist in the same group are necessarily in the same document. An efficient hash algorithm can be used to determine if word numbers are members of the same group. A hashing algorithm eliminates the need to conduct a binary search through multiple tables. Thus, the use of a hash greatly reduces the need to access tables to determine document level information, greatly reducing the system overhead used by conventional systems to determine whether two words exist in the same document.

The cross-reference table maintains the relationship between documents and groups of word numbers. Preferably a cross-reference entry exists for each group of word numbers. If the hash algorithm indicates that two word numbers are from different groups, the cross-reference table can be accessed to determine if the two different groups of word numbers were assigned to the same document. The cross-reference table can also be accessed to determine to which specific document a word is associated, which may be necessary for specific document level operations.

According to another embodiment of the present invention, hashing can be reduced by ensuring that a minimum delta (difference) exists between the final word number of any document and the initial word number of any other document. The use of a minimum delta further simplifies, and reduces the overhead involved in, determining whether two word numbers exist in the same document. If the numeric difference between two word numbers is less than the minimum delta value, the words are necessarily within the same document. The combination of a minimum delta value and a predetermined group size dramatically reduces the overhead involved in determining whether word numbers exist within the same document.

According to yet another embodiment of the present invention, a boundary table containing an entry corresponding to each entry in the cross-reference table is generated. The boundary table is preferably a bit table whose entries indicate whether a corresponding entry in the cross-reference table is the first entry associated with a document or a subsequent entry associated with a document. The boundary table can be used to determine whether a document boundary exists between two different groups of word numbers via an efficient bit operation, eliminating the need to index into the cross reference table. This is useful in those instances in which two word numbers are not within a minimum delta value distance of each other, and do not hash to the same group of word numbers. The use of boundary table reduces the overhead involved in determining whether words exist within the same document. The present invention thus implements several mechanisms for quick and efficient document level determinations through simple mathematical determinations, and a minimum of table accesses. Where a large number of documents are being indexed, such mechanisms, alone or in combination, can greatly reduce overall processing time.

According to another embodiment of this invention, word registers are used to implement search requests. A word register maintains word, and if necessary document, information about a search word. The word register includes a register document list and a register word list. The register word list contains a list of word numbers associated with the search word in the documents, and the register document list contains a list of references to the documents containing the search word. The register document list also contains the lowest and highest word number contained in the register word list for each respective reference to a document. The word register thus contains the relevant word information, and document information if necessary, for words in a search request. As requests are processed, search request operations, such as AND, OR, or proximity, are applied to word registers. Such an operation typically creates a new word register containing a register document list and register word list that contains the results of the operation.

In certain situations, the register document list need not be updated until a document level operation needs to be performed on the register. For example, a proximity operation can be performed on the register word lists of two word registers without needing to update or even validate the register document list. This is because the word numbers themselves are all that is necessary to determine the proximity of words with respect to each other. Thus, generation of the register document list is delayed until a document level operation, such as an AND operation, is applied to the word register. The ability to delay, or in some instances eliminate, generation of the register document list adds increased efficiency to search word processing.

According to yet another embodiment of the present invention, the word list of the full text index contains relevance information for the indexed words. For example, the relevance of a word can differ depending on whether the word is used in a title of a document, whether the word is bolded or underlined, the frequency of a word within a document, the number of occurrences of the word in the full text index, the proximity of words with respect to each other, and other considerations. Such relevance considerations are converted to relevance numbers, or values, and can be used during the search process to bubble more relevant documents to the top of the list presented to a user. The use of relevance numbers is becoming increasingly important because of the large number of documents that frequently make up a set of indexed documents. Relevance values of search words are typically combined during the processing of a search request Consequently, relevance calculations play a role in the overall processing time of a search request, and inefficient relevance calculations can result in unacceptable response times.

According to one embodiment of the present invention, the word register includes a document relevance list which contains a list of relevance numbers, each relevance number corresponding to a respective reference in the register document list. The word register also includes a word number relevance list that contains a list of relevance numbers, each relevance number corresponding to a respective word number in the register word list. Thus, as operations are applied to word registers, relevance numbers are also evaluated and combined to form new relevance numbers. Relevance numbers at the word level are combined into a document level relevance number when the register document list is generated or updated. Such document level consolidation eliminates the need to continually reevaluate multiple word-level relevance numbers.

According to yet another embodiment of the present invention, word numbers can be maintained and manipulated singularly, or word numbers can be combined into "clusters," and the clusters can be manipulated as a single entity. Each word number cluster includes one or more word numbers that have been combined during a word register operation, and which therefor satisfy a search operation, such as a proximity operation, and can thereafter be treated as a single word number. A word cluster has a single relevance number associated with it, eliminating the need to repeatedly process multiple independent word relevance numbers. Treating clusters of word numbers as one unit allows the attachment of a single relevance value to a semantic unit.

According to another embodiment of the present invention, a system is provided for maintaining relevance information during a word search of a plurality of documents. The system includes a first word register that is operative to maintain first word level information and first attribute relevance values for occurrences of a first word. A second word register is operative to maintain second word level information and second attribute relevance values for occurrences of a second word. A result word register is operative to maintain result word level information and cumulative relevance values for results of an operation applied to the first and second word registers, each cumulative relevance value being determined at least partially as a function of an attribute relevance value associated with at least one occurrence of a word in the first word register and an attribute relevance value associated with at least one occurrence of a word in the second word register.

According to still another embodiment of the present invention relevance values are "self-normalizing" and are maintained in a predetermined relevance value range. Document level relevance values are independent of any other document level relevance values associated with the documents, and can thus be returned to a user immediately.

According to yet another embodiment of the present invention, a method is provided for maintaining relevance information during a word search of a plurality of documents. A first word register is loaded with a plurality of word numbers associated with the occurrence of a first word in a plurality of documents, at least some of the word numbers having an attribute relevance value associated therewith. The second word register is loaded with a plurality of word numbers associated with the occurrence of a second word in the plurality of documents, at least some of the word numbers having an attribute relevance value associated therewith. An operation is applied against the first and second word registers and a result word register is generated, the result word register including at least one word number cluster having a processing relevance associated therewith, the processing relevance number being generated at least partially as a function of attribute relevance information contained in the first and second word registers.

Still other objects of the present invention will become apparent to those skilled in this art from the following description wherein there is shown and described preferred embodiments of this invention, simply by way of illustration, of one of the best modes contemplated for carrying out the invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 1 is a diagram illustrating an association between indexed documents and word numbers according to one embodiment of the present invention;

FIG. 2 is a diagram illustrating document level information in a full text index according to one embodiment of the present invention;

FIG. 3 is a diagram illustrating word level information in a full text index according to one embodiment of the present invention;

Reference will now be made in detail to present preferred embodiments of the invention, examples of which are illustrated in the accompanying drawings, wherein like numerals indicate the same elements through the views.

DESCRIPTION OF PREFERRED EMBODIMENTS

Figure 4:
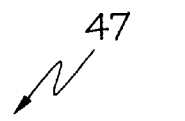
FIG. 4 is a diagram of a cross-reference table of a full text index according to one embodiment of the present invention.

The ability to search and retrieve relevant documents from a large pool of documents is becoming increasingly important as more and more documents become available for on-line searching. Such searching is frequently referred to as full text searching, and is performed by a searcher, or search engine, against a full text index. For example, there are hundreds of millions of Web pages on the Internet that contain searchable information. When an Internet user enters a search request in a search engine, the primary concerns are that the search be relatively quick, and that the search return links to relevant documents. The importance of full text searching is not limited to the content of Internet Web pages. Businesses are making available large quantities of documents containing a variety of information to its employees.

Searches typically occur in two stages. The first stage involves generating a fill text index which contains information about the words in the pool of indexed documents, and the location of the documents. The second stage involves processing a search request and accessing the full text index and returning references to the documents that satisfy the request.

Inefficiencies that exist in either the full text index or the searching algorithms can result in poor response time, or the inability to distinguish relevant documents from irrelevant documents. In either event, users will be dissatisfied with the performance of the search engine. Several factors can contribute to poor performance. One relates to the large number of documents that may be indexed by a particular search. The word "indexed" is used herein to refer to the set of documents that can be accessed through the search engine. In an Internet search engine, the indexed documents typically comprise all Web pages that the search engine has located. In a company's intranet, the indexed documents may be various documents available on a particular file server. Inefficient search algorithms may provide adequate response times when only twenty or thirty thousand documents are indexed. The same inefficient algorithm may result in extremely poor response time when a million documents are indexed. Thus, as larger numbers of documents are indexed, efficiency becomes of prime importance.

One reason for poor retrieval performance in a full text indexing system is because of the sheer magnitude of a full text index. Full text indexes of large numbers of documents can be hundreds of megabytes or even gigabytes in size. Thus, a complete full text index will rarely fit in the memory of a computer. Moreover, retrievals in a full text indexing system will often be processed in multiple threads running at the same time. With many threads executing simultaneously, a relatively small amount of memory may be available to any individual thread even in a system with a relatively large total amount of memory. When processing a full text index, it is frequently necessary to access large index tables to obtain information either about the search words, or the documents. Each table access will often result in one or more I/O operations to a peripheral, an extremely time-consuming operation compared to a memory access. Multiple table access operations that result in many I/Os can significantly reduce overall response time. A single search can require millions of table accesses, resulting in poor response time where a significant percentage of the accesses resulted in I/O operations. Thus, one mechanism for improving performance in a fill text indexing system is to reduce the number of table access operations.

Another aspect relating to performance is the complexity of the search request. Complex search requests having a combination of AND, OR, NOT, and proximity operators typically result in the search engine performing multiple operations. Furthermore, the increasingly popular "natural language" query engines can result in many sub-queries being performed. For example, a search request for "George Washington crossing the Delaware," may result in search requests for: (1) 'GEORGE WASHINGTON' WIN SAME SENTENCE as 'CROSSING DELAWARE', (2) 'GEORGE WASHINGTON' WITHIN 10 WORDS OF 'DELAWARE,' (3) 'GEORGE WASHINGTON' and (4) 'CROSSING DELAWARE'. Consequently, a search engine that appears to provide adequate response time for simple requests may in fact be inadequate when processing natural language and/or more complex requests.

Another aspect to full text searching relates to document relevance determinations. Where the pool of indexed documents is relatively large or where the search request is too inclusive, a large number of documents may satisfy the search request. Ideally the search engine attempts to determine the relevance of the documents and presents the documents to the user in decreasing order of importance. Ranking documents in order of relevance is very important because hundreds of thousands of documents may satisfy a search request. To accomplish this, the search engine makes determinations regarding the relevance of the documents in view of the user's search request. Relevance can be determined by a number of different factors, such as, for example, whether a search word appears in a title, is bolded, or is underlined. Relevance can also be affected by information in a document, such as the proximity or order of words with respect to each other, or the number of times a word occurs in a document. While relevance determinations are desirable, they can require considerable processing, and inefficient relevance determination algorithms can result in poor response time.

Word Numbers

Referring now to FIG. 1, a diagram illustrating an association between indexed documents and word numbers according to one embodiment of the present invention is shown. In the full text index generation stage, the words in each document are analyzed and assigned unique word numbers. The phrase 'document' as used herein means any indexable item or component, such as files, objects, documents, database records, and the like. The phrase 'word' as used herein means units within a document, and includes words, terms, word roots, or any other searchable entity within the document.

During the index generation stage, the full text indexing system of the present invention allocates at least one group of word numbers to each indexed document. The group of word numbers has a predetermined group size, or number of word numbers. The predetermined group size can be arbitrary, and can differ according to implementation considerations. For example, if the average number of words per indexed document is 100, it may be preferable to make the predetermined group size 100 word numbers or less. Larger group sizes, such as 250 or 500 word numbers, would result in "wasting" an average of 150 to 400 word numbers per document, and would result in the use of much larger word numbers than would otherwise be required if the predetermined group size were smaller. As discussed in greater detail herein, each group of word numbers will have a corresponding entry in a cross-reference table. Using too small of a predetermined group size will result in a much larger cross-reference table than otherwise necessary, and will result in the need to index the cross-reference table more frequently than would be required if a larger predetermined group size were used. Therefore some rudimentary knowledge of the content of the indexed documents can be helpful in determining an appropriate predetermined group size. For purposes of illustration, and as discussed throughout this application, a predetermined group size of 256 word numbers will be used. A predetermined group size that is a power of two may be beneficial in that certain calculations can be accomplished with a binary shift, increasing efficiency.

FIG. 1 shows the contents of three indexed documents, and the word numbers assigned to the words in the documents by the full text indexing system of the present invention. The dashed lines about the word numbers indicate that the word numbers are not part of the document itself, but are being illustrated merely to show the relationship between words and word numbers. Although for simplicity and brevity the description herein will discuss word numbers as "existing in a document" or "being within x words" of one another, it will be understood that it is the words themselves that exist in the documents, and that word numbers are merely used to indirectly refer to specific words. Document 25 contains 869 words. Since the predetermined group size in this example is 256 word numbers, four groups of word numbers have been allocated to document 25. As described in greater detail herein, the word numbers are used in the full text index to indicate the relative location of the words in the documents. The phrase "initial word number" refers to the first word number associated with a document, and the phrase final word number refers to the last word number that is associated with a word in a document. Note that the final word number may be different from the highest word number in the last group of words associated with a document. Document 30 reflects the next indexed document, and contains 506 words. Initial word numbers of a document begin on a word number group boundary. For example, since the final word number of the previous indexed document, document 25, was 869, the initial word number used in document 30 is 1025 (256*4+1). Where the initial word number group begins with the number one (as opposed to zero), the first word number in each word number group minus one is a multiple of the predetermined group size. For example, 1025 minus 1 divided by 256 equals 4.

Document 30 contains 506 words, and has a final word number of 1530. Document 35 is the next indexed document, and has an initial word number of 1793. 1793 minus 1 divided by 256 equals 7, and thus is a multiple of the predetermined group size. The word number group beginning with the word number 1537 will not be used for reasons relating to the use of a minimum delta value between documents, as discussed in greater detail herein.

FIG. 2 illustrates a layout of a document table 36 according to one embodiment of the present invention. Document table 36 is a table containing document level information about the indexed documents, such as the name and location of the document. The fields in document table 36 can include the name of the document, and a location such as a path name or uniform resource locator (URL).

FIG. 3 illustrates a word list, or word table 37, according to one embodiment of the present invention. Word table 37 is another structure of the full text indexing system of the present invention, and maintains information regarding the words in the indexed documents. While for simplicity word table 37 is shown as a simple alphabetical table of word entries, in practice such a structure can be maintained as a binary tree, or any other suitable structure for fast and efficient access to the information associated with a particular word entry. Information maintained about the words includes the word numbers that reflect the locations of the word within the indexed documents. For example, the word "BLACK" exists at word numbers 7, 1794, 1801, 3012, 4296, 6964 and 8923. As discussed in greater detail herein, a cross-reference table can be used to associate a word number with a particular document. Relevance information may also be maintained in word table 37. Relevance information can be used by the full text indexing system to determine the importance, or relevance, of the documents that satisfy a search request. 'Attribute' relevance information that is stored in word table 37 is created as the full text index is being generated. Such attributes can include characteristics about the respective word. For example, entry 40 contains word numbers where the word "BLACK" appears in the title of a document. Entry 42 contains word numbers where the word "BLACK" appears in both a title and is capitalized. Additional relevance attributes can include whether the word's first letter is capitalized, and whether it is a common or uncommon word, for example. The use of such relevance information will be discussed in greater detail herein.

The full text indexing system according to the present invention translates the words in a search request into word numbers associated with such words through interaction with word table 37. Word registers can then be loaded with these word numbers. Thus, operations, such as AND, OR, NOT, and proximity operations such as WITHN 10, are performed using word numbers rather than the words themselves. For example, a search request may seek all documents wherein the word GREEN is within ten words of the word BLACK. As shown in word table 37, the word BLACK exists at word numbers 7, 1794, 1801, 3012, 4296, 6964, and 8923. The word GREEN exists at word numbers 3, 10, 1037, and 1803. The search engine can quickly determine that word numbers 3 and 10 (GREEN) are within 10 words of word number 7 (BLACK), and that word number 1801 (BLACK) is within 10 words of word number 1803 (GREEN). One difficulty, however, is in determining whether word numbers 3, 7, and 10 are contained within the same document, and thus satisfy the search request, or are located in different documents, and thus do not satisfy the search request. The same determination must be made with respect to word numbers 1801 and 1803. To make such determinations, conventional search engines access document level information maintained in a table. Because a full text index can be hundreds of megabytes in size, table indexing frequently requires an I/O to disk. Peripheral I/Os are extremely time-consuming and can significantly adversely affect response time. Minimizing table indexing is thus important to providing acceptable response time. Because word numbers according to the present invention are allocated in a predetermined group size, table indexes can often be avoided by performing a numeric calculation, or hash, to determine whether two word numbers exist within the same word number group. If they do, then the word numbers necessarily exist in the same document, and a table access is avoided. Assuming the initial allocated word number is one, as opposed to zero, and the predetermined group size is 256, a suitable calculation would be the following:

$$\text{GROUP}=((\text{WORD NUMBER}-1)/\text{GROUP SIZE})+1$$

Using this calculation, word numbers 3, 7, and 10 hash to group number one, indicating that each of these word numbers (or more precisely the words to which they correspond) is contained within the same document. The ability to determine such document level information without the need to access one or more tables in memory greatly increases the efficiency of the search algorithm and reduces time-consuming I/Os to disk.

According to another embodiment of the present invention, it is ensured that a predetermined minimum delta value exists between the final word number associated with any document and the initial word number of any other document. In other words, it is ensured that there is at least a minimum delta value distance between two word numbers associated with words in any two individual documents. Like the predetermined group size value, the minimum delta value can be an arbitrary number, and may differ depending upon the content of the indexed documents. If the minimum delta value is too large, word numbers may be "wasted" resulting in usage of very large word numbers. If the minimum delta value is too small, it will be of limited use. For purposes of illustration, a minimum delta value of 32 will be used. The use of a minimum delta value further simplifies and reduces the overhead in determining whether two different words exist within the same document. Referring again to the previous example, the word GREEN exists at word numbers 3 and 10, and the word BLACK at word number 7. With a minimum delta value of 32, the search engine need only determine whether each number is within 32 of the other number, and if so, it is ensured that each word is located in the same document. Since the word numbers 3, 7, and 10 are within 32 of each other, they necessarily exist within the same document. Note that neither a hash process or other calculation, nor a table index was required to make this determination.

Referring again to FIG. 3, it is noted that the word BLACK is located at word numbers 1794 and 1801, and the word GREEN is located at word number 1803. Since the difference between 1794 and 1803 is less than the minimum delta value of 32, the search engine can quickly determine that these word numbers all exist within the same document, and thus satisfy the search request.

The use of a minimum delta value can result in NULL, or unused, groups of word numbers. For example, referring again to document 30 of FIG. 1, the final word number associated with a word in document 30 is 1530. The next group of word numbers would ordinarily begin with the word number 1537, since 1537 minus 1 is an even multiple of the predetermined group size 256. However, 1537 is less than the minimum delta value distance, 32, from the final word number of document 30, 1530. Consequently, the group of word numbers beginning at 1537 and extending through 1792 will not be used, and the next assigned word number will be 1793, as reflected in document 35.

FIG. 4 illustrates a document cross-reference table 47 according to one embodiment of the present invention. Cross-reference table 47 establishes an association between word number groups and the documents to which the word number groups have been assigned. For example, entry 48 indicates that word numbers between 1 and 256, inclusive, are located in document number 1. Similarly, entry 56 indicates that any word number between and including 1793 and 2048 exists in document number 3. The document record offset column can contain a byte offset into document table 36 of the information, or entry, associated with the respective document. Cross-reference table 47 is used to determine in what document a word number exists, and can be used when the minimum delta value and/or hashing algorithm are unable to determine if two word numbers exist in the same document. For example, consider the search request FIND MAUVE WITHIN 160 OF AQUA. As reflected in entries 38 and 43 of word table 37 (FIG. 3), the word AQUA exists at word numbers 1029 and 2059, and the word MAUVE exists at word numbers 1032 and 1805. The search engine of the present invention can quickly determine that the word numbers 1032 (MAUVE) and 1029 (AQUA) are within the minimum delta value 32 of each other and thus at least one document satisfies the request. The word numbers 1805 and 2059, however, are not within the minimum delta value of each other but are within the specified proximity of 160 words, and thus both word numbers are passed through the hash algorithm to determine whether they belong to the same word number group. Passing the word number 1805 through the hash algorithm returns a group number of 8, and passing the word number 2059 through the hash algorithm returns a group number of 9. Since these word number groups are different, additional information will be needed to determine if these word number groups exist in the same document. This information can be obtained, for example, from cross-reference table 47 to determine that group 8 and group 9 (and thus associated word numbers) both exist in the same document, document number 3.

Figure 5:
FIG. 5 is a boundary table according to one embodiment of the present invention.

FIG. 5 illustrates a boundary table 59 according to one embodiment of this invention. Each entry in boundary table 59 corresponds to an entry in cross-reference table 47. Each entry in boundary table 59 indicates whether the corresponding entry in cross-reference table 47 is the first cross-reference entry associated with a particular document or is a subsequent entry associated with a particular document. Thus, each entry in boundary table 59 corresponds to a word number group. Boundary table 59 is preferably a bit vector, containing ones and zeros, with a value of one indicating that the corresponding cross-reference entry is the first cross-reference entry associated with a particular document, and a value of zero indicating that the cross-reference entry is a subsequent entry associated with a specific document. Although, as described above, cross-reference table 47 can be accessed to determine if two word numbers exist in the same document, this involves a relatively expensive table index operation, and thus may be undesirable from an efficiency standpoint. Boundary table 59 is a more efficient mechanism for making such a determination. Boundary table 59 is preferably a bit vector, and thus takes much less space and can be processed much more efficiently than cross-reference table 47. The bits maintained in boundary table 59 allow for the fast and efficient determination of whether two word number groups have been assigned to the same document. Since a value of '1' in a boundary table entry indicates the boundary of a document, the search engine need only determine whether the value '1' exists in any boundary table entry between the two boundary table entries that correspond to the two word number groups. This determination is typically made by first hashing the word numbers to an index value associated with their respective word number groups, as discussed previously. These index values can then be used to index the boundary table 59. If any boundary table entry between the lower index value and the higher index value is a '1' (excluding the lower index entry itself), the word number groups are associated with separate documents. The absence of a '1' between the lower and higher entries indicates that the word number groups are associated with the same document.

Using the previous example, and referring again to FIGS. 4 and 5, word number 2059 hashes to index value (group) 9, and word number 1805 hashes to index value (group) 8. The lower entry (8) is ignored, since a '1' in the lower entry merely indicates the beginning of a document. Since a '1' does not exist between boundary table entry 8 and boundary table entry 9, the word number groups are associated with the same document. As another example, assume that a first word number hashes to group 4, and another word number hashes to group 6. Since entry 5 of boundary table 59 contains a '1', indicating that the word number group corresponding to entry 5 is the first word number group in a document, the two word numbers exist in two separate documents. As yet another example, assume a first word number hashes to group 8, and a second word number hashes to group 11. Since no '1's exist between entries 8 and 11, other than in the initial entry 8 itself, both words exist in the same document. Boundary table 59 is another mechanism according to the present invention to eliminate table indexing to determine document level information.

Word Registers, Relevance and Clusters

Figure 6:
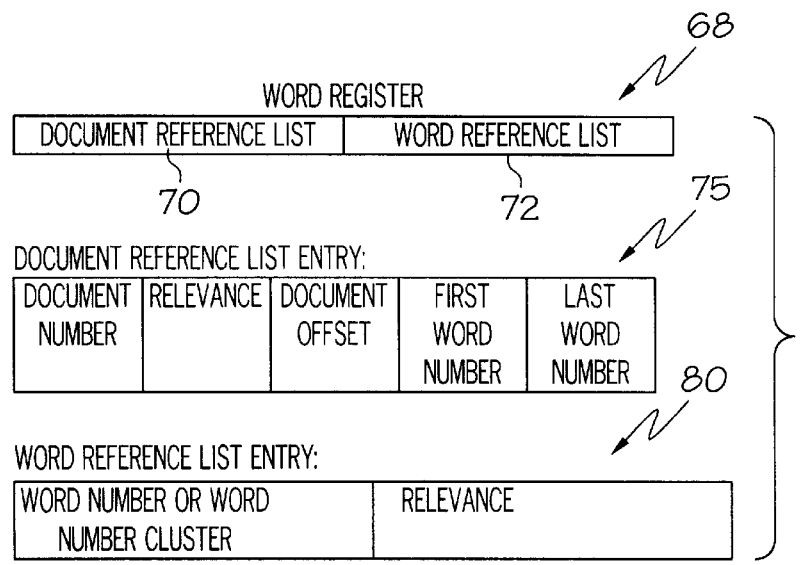
FIG. 6 is a diagram of a layout of a word register according to one embodiment of the present invention.

According to one embodiment of the present invention, word registers are used during search request processing to maintain word and document information. FIG. 6 shows the layout of a word register 68 according to one embodiment of this invention. Word register 68 contains a document reference list 70 and a word reference list 72. Document reference list 70 comprises one or more document reference list entries 75. Each document reference list entry 75 can include a document number, a relevance number associated with the document, a document record offset, a first word number and a last word number. The document number can be used as a reference to the corresponding document entry in document table 36. The relevance number is a consolidated relevance value derived from a plurality of word relevance numbers, and will be discussed in greater detail herein. The document record offset identifies the location of the corresponding document record in document table 36. Use of an offset allows for variable length records in document table 36. The first word number and last word number represent the first and last word numbers which relate to this document and which exist in the word reference list 72 of this respective word register.

The word reference list 72 comprises one or more word reference list entries 80. Each entry 80 includes a word number or a word number cluster. Clusters relate to the treatment of multiple word numbers as a single unit, and will be described in greater detail herein. Entry 80 also includes a relevance number associated with the respective word number or word number cluster.

Although the word register illustrated in FIG. 6 illustrates a word reference list entry as comprising a word cluster and a word relevance value, it is apparent that this information could physically be maintained in two separate lists, a word number list and a word relevance list. Similarly, although each document reference list entry is shown as having a document number and a document relevance number, it is apparent that this information could be physically maintained in two separate lists such as a document list and a document relevance list. In such embodiments, it is preferable that the index used to index into the document number list is the same index used to index into the relevance list to obtain the relevance number for that respective document number.

Word registers are used in the application of search operations such as AND, OR, and proximity operations. Word registers are typically created for each word in a search request, and may also be created as a result of an operation. A word register can be implemented as a structure, or array, in a programming language such as C, or can be implemented as an object in an object-oriented programming such as C++. In C++, the member data of a word register class can comprise the following:

```
class WordRegister:Register{
private:
    DocCompressedIndexStream *mpDocStream; // doc numbers
    WordDocHitInfoStream *mpDocInfoStream; // doc relevance
    numbers
    WordCompressedIndexStream *mpWordStream; // word numbers
    WordHitInfoStream *mpWordInfoStream; // word relevance
    QF_UINT32 mbDocStream Valid; //docstream valid/not valid
```

After a word register object is instantiated, the word reference list of the object is typically generated by accessing word table 37 and combining, through an 'OR' operation, each entry that relates to the specified word. The collection of entries in word table 37 that relate to a particular word will be referred to herein as a wordset. For example, to create the word reference list of a word register for the word "BLACK", entries 39, 40 and 42 of word table 37 would be 'OR'ed together. The word reference list would contain an entry for each word number associated with the word BLACK. Thus, the word reference list would contain word entries for word numbers 7, 1794, 1801, 3012, 4296, 6964 and 8923. Each of those entries would also have a relevance number associated therewith, also obtained from word table 68. The relevance numbers are determined from the attributes associated with the word in the "RELEVANCE" column of word table 37. Higher numbers indicate increased relevance. For example, word number 8923 will have a higher relevance than word number 4296, which will have a higher relevance than word number 1801.

As will be discussed in greater detail herein, one embodiment of the present invention maintains and calculates relevance information such that documents that match a search request can be ranked in order of importance. In general, two types of relevance are maintained, attribute relevance and processing relevance. Attribute relevance relates primarily to static attributes of words, and is collected during the generation of the full text index. Such static relevance information can comprise, for example, whether a word appears in a title, is bolded, was italicized, or offset in some special manner. Processing relevance relates to relationships of the words to each other, such as the proximity of one word to another word in a search request, or the number of occurrences of the word in a document. Processing relevance values are generated when an operation is being applied against a word register.

Determinations of what constitutes relevant information can differ among search engines. According to one embodiment of the present invention, it is preferable that a document that matches a two word query that is 'AND'ed together has a higher relevance than one that matches a single word query containing either one of the same words because there is a higher probability that the former document contains what the user is seeking.

According to one embodiment of the present invention, a partial relevance is calculated for the first of the two words. This partial relevance would be the total relevance if it were only a single word query. As the rest of the two word query is evaluated, a partial relevance is calculated for the second word, which also would be the total relevance if that were the only word in the query. A function is then used to combine the two single word relevances into a single total relevance for the query. The following algorithm is suitable for calculating the combined relevance from two single word relevances. $R_1$ is the single-word relevance of the first word, and $R_2$ is the single-word relevance of the second word. The combined relevance $R_{1\&2}$ would be:

$$R_{1\&2} = R_1 + R_2 - R_1 R_2.$$

The above equation ensures that the combined relevance should be greater than either individual relevance but still not over 100%. This equation approximates the exact probability by estimating it to be the second relevance percentage of the amount between the first percentage and 100%. For example, suppose the first relevance is 40% and the second relevance is 70%. Then the combined should be greater than either, and to ensure it does not exceed 100%, we can calculate it as 40%+70% of the 60% total possible increase available. That leads to a combined value of 82%. Mathematically this can be represented as $R_{1\&2}=R_1+R_2(1-R_1)$, which is equivalent to the above equation. Note that it gives the same value if word 1 and 2 are reversed. In the example given, 70%+40% of 30% is also equal to 82%. Two 10% probabilities combine to be 19%, and two 90% probabilities combine to be 99%.

The above discussion related to an 'AND' operation. There are three kinds of document matches that result from an 'OR' operation: matches containing only the first word, matches containing only the second word, and matches containing both words. Each of these three types can have its own relevance formula. Matches which have both words should be more relevant on the average than those with only one. The amount of increase for matches with both words preferably does not, however, increase as much as for an 'AND' operation because the user typically does not have an 'AND' in mind, and hence is not expecting hits to contain both words. A large use of the 'OR' operation is from linguistics, where many word forms are 'OR'ed together. A match having all of the forms is preferably slightly more relevant than one having only one form, but not as much as the above equation for the 'AND' operation would produce. Finally, a match having only one of the two words should have a slightly lower relevance than it would have had as a single word search because it now has only one of two possible words, rather than a perfect match on only one word. Thus, preferably, the characteristics of the 'OR' algorithm are:

a) A match having both words should be slightly more relevant than the higher of the two relevances for a single word query, and b) A match having only one of the two words should be slightly less relevant than for a single word query.

With this goal in mind, the following equations can be used:

$$R_{1|2}=R_1+R_2(1-R_1)/4,$$

for matches with both words, where $R_1$ is the greater of the two single word relevances; and $$R_{1 \cdot 2}=R_1-R_1/16,$$

for matches with only one word, where $R_1$ is the single word relevance for that match. Note that this latter equation is equivalent to dropping the relevance by about 6% of its value.

For example, if the query is Chemistry OR Alchemy, and if Chemistry is a 48% relevance by itself, and Alchemy a 64% relevance because it is a rarer word, then matches containing both words would be 68%, matches with only Chemistry would be 45%, and matches with only Alchemy would be 60%.

Preferably queries from multiple combinations of AND's and OR's will not be weighted according to how many operations have already been performed. For example, if there is a query for four words 'AND'ed together, and the relevance for the first three has been calculated, then it has already been weighted three times as heavily, so there is no need to treat it any differently from a simple AND operation.

Attribute relevance values are loaded into a word register from word table 37 at word register load time. Initially, no calculations are applied to the attribute relevance values from word table 37, and thus proximity or count are not taken into account. However, when clusters are formed when an operation is applied to a word registers, the cumulative relevance value associated with the cluster will be derived, in part, from the attribute relevance values of the individual words that compose the cluster.

Figure 7:
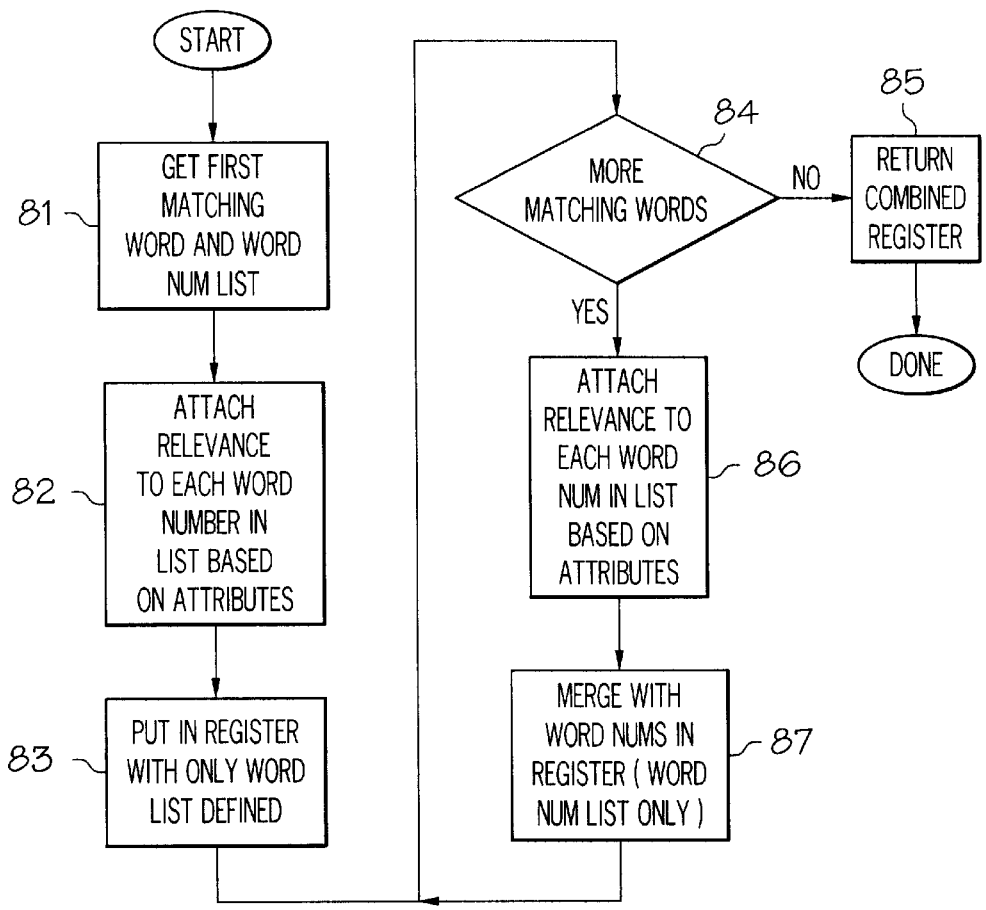
FIG. 7 is a flow diagram illustrating steps for creating a word reference list of a word register from a word table according to one embodiment of this invention.

FIG. 7 is a flow diagram illustrating steps for loading a word register from a word set in word table 37. At block 81, the first matching word entry in word table 37 is located. At block 82, an attribute relevance number is associated with each word in that entry. At block 83, the word list of the word register is loaded with this information. The document reference list is not generated at this point. At block 84, it is determined whether more entries in this word set exist If not, at block 85 the word register is returned and the process is completed. If more entries in this word set exist, at block 86 the next entry associated with this word is obtained from word table 37 and an attribute relevance number is associated with each word. At block 87, this information is merged with the word numbers previously loaded in the word reference list for this register. The steps of block 84 through block 87 are repeated until no more entries exist in the word set associated with this word. At the end of the process, a word register having a word reference list of the combined word entries and associated relevance values from word table 37 exists.

The document reference list of the word register is not generated unless necessary, and in fact may not be generated at all until the final result word register is returned. Following are several examples of the use of word registers according to one embodiment of the present invention. Each example assumes the documents, words, and associated word numbers as set forth in the drawings, unless otherwise stated.

EXAMPLE 1

| Search Request = "RED AND BLUE" |
| --- |
| WORDREG(RED) |
|    DOC REF LIST:   1,x,1,15; 2,x,1027,1036; 3,x,1797,1800 |
|    WORD REF LIST:   1,x; 11,x; 15,x 1027,x; 1035,x; 1036,x; 1797,x; 1800,x |
| WORDREG(BLUE) |
|    DOC REF LIST:   1,x,2,12; 2,x,1026,1038 |
|    WORD REF LIST:   2,x; 4,x; 12,x; 1026,x; 1033,x; 1038,x |
| WORDREG(RED AND BLUE) |
|    DOC REF LIST:   1,x,1,15; 2,x,1026,1038 |
|    WORD REF LIST:   1,x; 2,x; 4,x; 11,x; 12,x; 15,x; 1026,x; 1027,x; 1033,x; 1035,x; 1036,x; 1038,x |

In the examples, individual word registers will be labeled and referred to in the following format: WORDREG (identifier) where identifier refers either to a specific word, for example, RED, or the result of an operation, for example BLUE AND RED. Fields within an entry are separated by commas, and entries are separated by a semi-colon. For ease of illustration, all relevance numbers are represented by an "x." The use of an "x" for relevance numbers does not imply identical relevance values but rather simplifies the illustration of other aspects of the invention, such as the use of word registers, and clusters.

To perform the operation "RED AND BLUE," initially the word reference list associated with WORDREG(RED) is loaded with the word numbers and relevance numbers associated with the word set for the word RED from word table 37. Similarly, the word reference list of WORDREG (BLUE) is loaded with the word numbers and relevance numbers associated with the word set BLUE from word table 37. Because the operation between the word registers is an AND operation, the document reference list of each word register is then generated after the generation of the word reference list. The document reference list of a register is generated by examining the word reference list of the same register, and creating a document reference list entry for each document referred to in the word reference list. For example, examining the word reference list of WORDREG (RED), word numbers 1, 11, and 15 are all associated with document one. Thus, an entry is made in the document reference for document one, with the document number field being set to 1, and the relevance field being calculated from the combination of word relevance numbers and set to x. The first word number field is set to 1 and the last word number field is set to 15, reflecting that the first word number associated with this document in the word reference list is 1 and the last word number associated with this document in the word reference list is 15. Similarly, entries are made in the document reference list for documents two and three.

In a similar fashion, the document reference list for WORDREG(BLUE) is generated by processing the word reference list for that respective register. After the document reference lists have been generated, a result word register, referred to as WORDREG(RED AND BLUE), is generated.

Certain search operations, such as a proximity operation, are performed using solely the word reference lists. Other operations, such as the AND operation, are performed using the document reference lists, since an AND operation merely requests documents that contain certain words, regardless of the proximity of the words. To perform an AND operation, the document reference list entries of the two word registers are ANDed together, resulting in a document reference list containing document references that existed in both word registers. In a word register containing the result of an AND operation, the document reference list is generated before the word reference list is generated. Thus, the document reference list of the result word register, WORDREG(RED AND BLUE), will contain entries for documents one and two, but not document three because document three did not exist in the document reference list for WORDREG(BLUE). For each document reference list entry in WORDREG(RED AND BLUE), the lowest value of the first word number field of the corresponding document reference list entry in either WORDREG(RED) or WORDREG(BLUE) is determined and loaded into the first word number field for the entry in WORDREG(RED AND BLUE), and a similar process determines the contents of the last word number field for the respective entry. Thus, at the end of the AND operation, a document reference list entry exists for document number one having a first word number of 1 and a last word number of 15. Similarly, an entry exists for document two having a first word number of 1026 and a last word number of 1038, reflecting that 1026 was the lowest first word number for document two in either WORDREG(RED) or WORDREG(BLUE), and that word number 1038 was the highest value of the last word number in either WORDREG(RED) or WORDREG(BLUE).

After the document reference list entries are created, the word reference list for WORDREG(RED AND BLUE) is generated. The word reference list is generated by processing the word reference lists of both WORDREG(RED) and WORDREG(BLUE), and moving word reference list entries that fall within the range of the first word number and the last word number for each document in the document reference list of WORDREG(RED AND BLUE).

Figure 8:
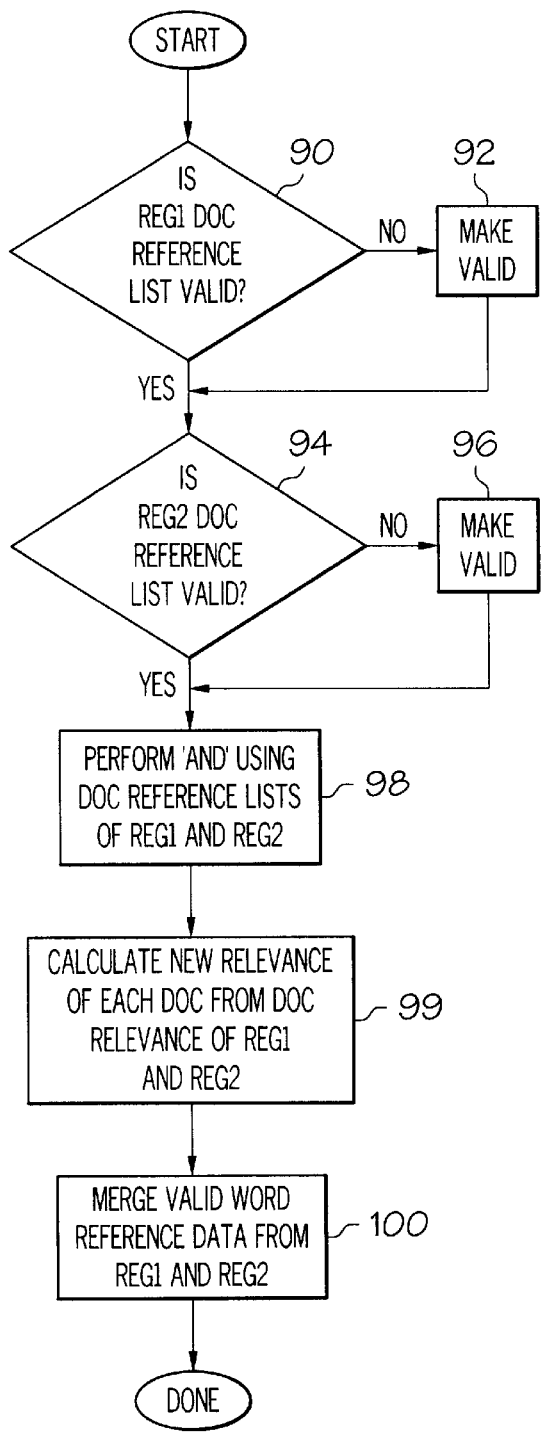
FIG. 8 is a flow diagram illustrating steps for performing an AND operation against two word registers according to one embodiment of the present invention.

FIG. 8 is a flow diagram illustrating a process for performing an AND operation against two word registers according to one embodiment of the present invention. FIG. 8 assumes that the word reference lists associated with each word register have already been loaded from word table 37. At block 90, it is determined whether the document reference list associated with the first word register is valid. By valid, it is meant whether it was previously necessary to "push up" the word information to the document reference level. As will be discussed in greater detail herein, certain operations, such as a proximity operation do not require the use of document reference information, and thus word registers may have valid word reference list information but not valid document reference list information. When a word register is initially created, a flag can be set to indicate that the document reference list information is not valid. Prior to doing an AND operation, if such flag is set (indicating that the word reference information has never been "pushed up" to document level), at block 92 the word reference list will be processed to generate the document reference list information. At blocks 94 and 96 the same determinations are made with respect to the second word register. At block 98 the document reference lists are "AND"ed together to generate a single document reference list in a new result word register. At block 99, a document relevance number is derived from the document reference lists of the two word registers for each document entry in the result word register. At block 100, the word reference list in the result word register is generated from the first and second word registers according to the results of the AND operation on the document reference lists.

According to one embodiment of the present invention, as word numbers are processed during search operations, they can be grouped into "clusters," allowing multiple word numbers to be treated as a single semantic unit. The use of clusters according to the present invention allows relevance determinations to be handled very efficiently, as only a single relevance number is associated with a word cluster, thereby eliminating the need to repeatedly maintain and process relevance numbers for each individual word number. In the drawings and examples, clusters are represented by comma delimited word numbers bracketed with parenthesis. While the drawings and examples may distinguish between a single word number and a cluster of word numbers, internally, the present invention preferably treats all word numbers as a cluster of word numbers, whether the cluster contains a single word number or a group of word numbers. Thus, when describing the drawings herein, reference will be repeatedly made to clusters, or "hits." A hit refers to a cluster of a particular word register, and a hit can contain one or more word numbers. It should be kept in mind that a cluster or hit can contain either a single word number or multiple word numbers, but will have only a single relevance number associated therewith.

Figure 9:
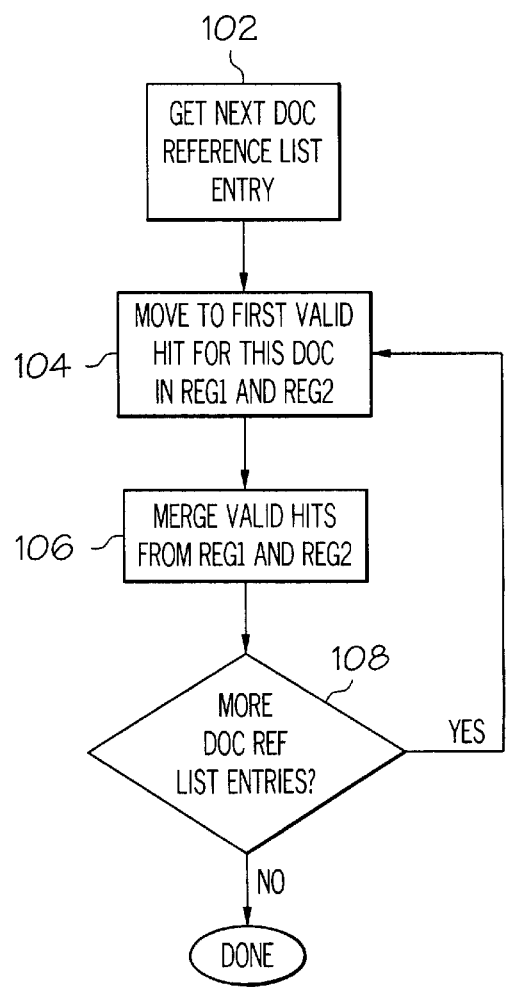
FIG. 9 is a flow diagram illustrating in greater detail the steps illustrated in block 100 of FIG. 8.

FIG. 9 is a flow diagram illustrating steps performed at block 100 of FIG. 8 in greater detail. At block 102, the next document reference list entry is obtained. At block 104, the search engine traverses the word reference list to the first valid hit, or cluster, that relates to this document in both REG1 and REG2. The first valid hit is determined through the use of the first word number and last word number fields in the document reference list entry for this document. For example, each cluster in the word reference list is examined until the lowest word number in the cluster is equal to or greater than the first word number of the document reference list entry for this document. At block 106 valid hits, or clusters, are merged from the first and second word registers. At block 108 it is determined whether additional document reference list entries exist, and if so, blocks 104 and 106 are continually repeated until all document reference list entries have been processed.

Figure 10:
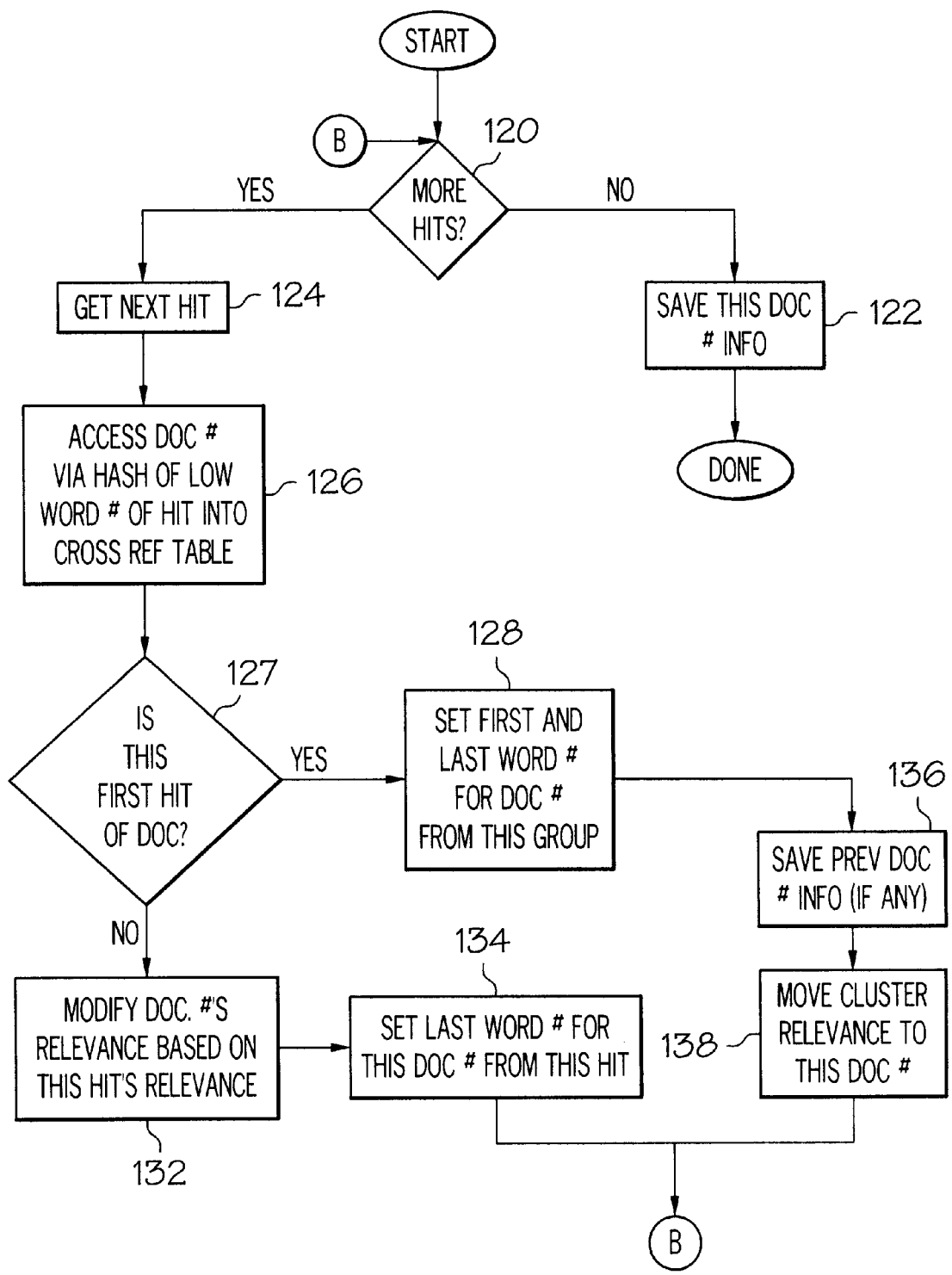
FIG. 10 is a flow diagram illustrating in greater detail the steps illustrated in blocks 92 and 96 of FIG. 8.

FIG. 10 shows in greater detail the steps performed for making the document reference list valid as represented in blocks 92 and 96 of FIG. 8. At block 120, it is determined whether additional clusters, or hits, exist in the word reference list for this register. If not, the document level information is saved to the word register at block 122, and the process is finished for this respective document. If additional hits do exist, then at block 124 the next hit is extracted from the word reference list. At block 126, the low word number of the hit is hashed to obtain a group number, as discussed previously, and the group number is used to index the cross-reference table 47 (FIG. 4) to determine the document number. At block 127, it is determined whether this is the first hit in the word reference list for this document. If so, then at block 128 the first and last word number fields for this document are set from this hit. At block 136, the document level information associated with the previous document is saved in the document reference list entry. At block 138 the cluster relevance of the hit is moved to the respective document relevance field, because this hit is the first hit associated with this document. Control returns to block 120. If at block 127 this was not the first hit of the document, then at block 132 the relevance number for this document is modified based on the relevance number associated with this hit. At block 134, the last word number for this document number is set from this cluster, and control returns to block 120.

Figure 11:
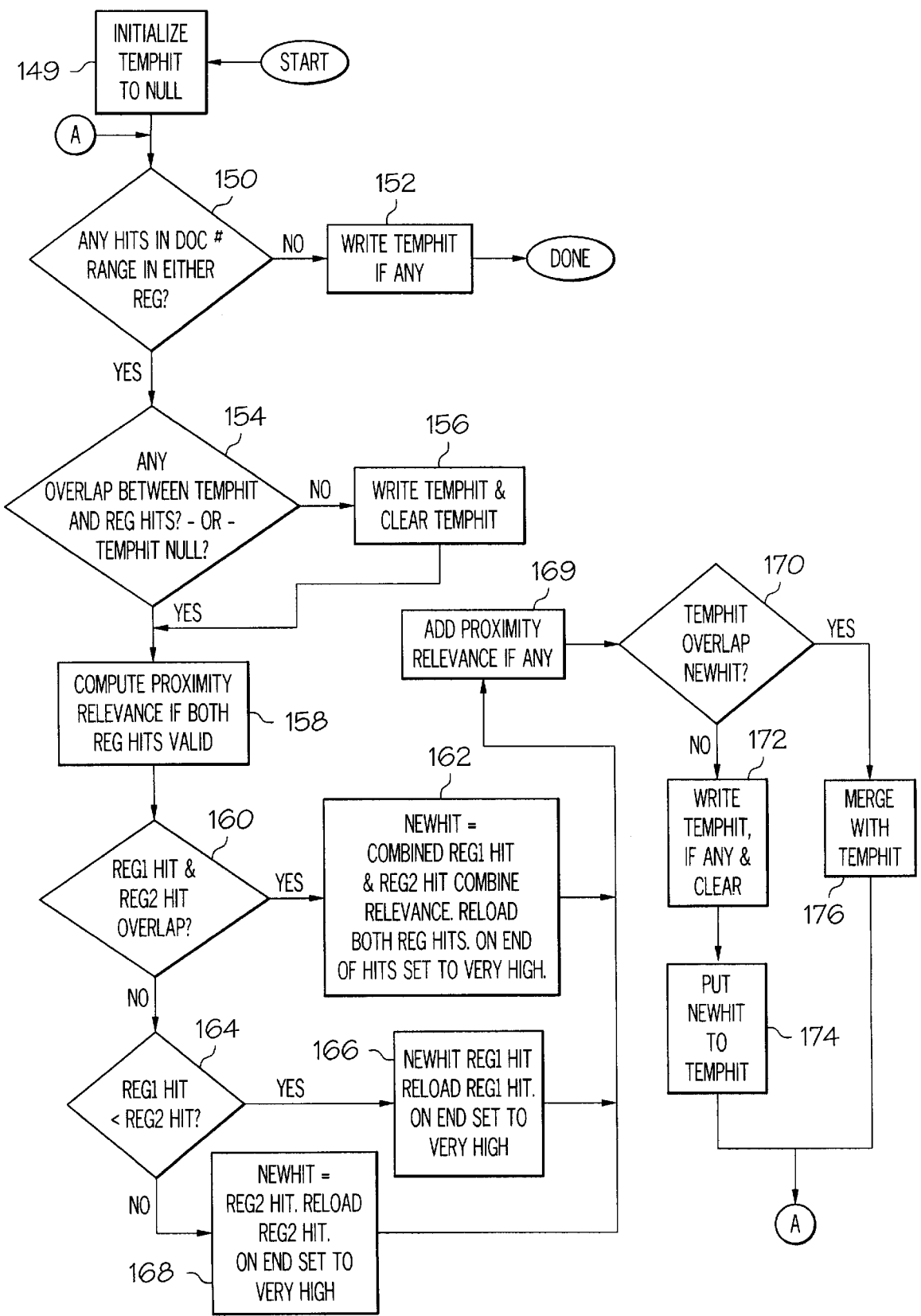
FIG. 11 is a flow diagram illustrating in greater detail the steps illustrated in block 106 of FIG. 9.

FIG. 11 is a flow diagram illustrating in greater detail steps for performing the process referred to in block 106 of FIG. 9 relating to merging valid hits from two word registers. For simplicity, the two word registers will be referred to as register one and register two, respectively. At block 149 a variable TEMPHIT is initialized to NULL. At block 150 it is determined whether there are clusters, or hits, in either of the word registers that fall within the value of the first word number and last word number fields in the document reference list entry for the respective document. At block 150, if a valid hit exists in register one, it is loaded into a variable entitled REG1HIT. Likewise, if a valid hit exists in register two, it is loaded into a variable entitled REG2HIT. If not, then at block 152, the TEMPHIT variable is written to the result word register if TEMPHIT is not NULL. If at block 150, a hit exists in either of the word registers, then at block 154 it is determined whether any overlap exists between the hit contained in the TEMPHIT variable and the hits from either register, or, whether the variable TEMPHIT is NULL. If there is neither overlap, nor is TEMPHIT NULL, then at block 156 the variable TEMPHIT is written to the result register and cleared. At block 158, if hits existed in both registers, a proximity relevance value is calculated. Calculations for relevance values will be discussed in greater detail herein. At block 160, it is determined whether REG1HIT and REG2HIT overlap. If so, at block 162 a new cluster formed from the clusters loaded in REG1HIT and REG2HIT is stored in a variable entitled NEWHIT. This process involves combining two clusters into a single cluster. For example, assume REG1HIT contains the cluster "(1,3)" and REG2HIT contains the cluster "(2,4)". In this example, the two hits overlap because one hit includes a word number that falls within the range of the other hit. In such an instance, the hits are combined into a single cluster, and thus NEWHIT would equal "(1,2,3,4)". At block 162 the relevance values associated with each of REG1HIT and REG2HIT are combined into a single relevance and associated with NEWHIT. Both REG1HIT and REG2HIT are reloaded with a hit from their respective word register. If either word register has reached its end point, the variable associated with that register is set to a very high value. If at block 160, REG1HIT and REG2HIT did not overlap, then at block 164 it is determined whether REG1HIT is less than REG2HIT. If so, at block 166 the variable NEWHIT is set to the value of REG1HIT. REG1HIT is loaded with the next hit from register one. If no more hits exist in register one, REG1HIT is set to a very high value. If at block 164 REG1HIT was not less than REG2HIT, then at block 168 the variable NEWHIT is set equal to REG2HIT. REG2HIT is loaded with the next hit from word register two. If no more hits exist in word register two, REG2HIT is set to a very high value. At block 169 any proximity relevance value that has been calculated at block 158 is combined with any existing attribute relevance to generate a single relevance value.

At block 170 it is determined whether the variable TEMPHIT overlaps the variable NEWHIT. Again, this refers to whether word number(s) in the variable TEMPHIT overlap with word number(s) in NEWHIT. If so, the two clusters are merged into a single cluster at block 176 and control returns to block 150. If not, at block 172 the variable TEMPHIT, if any, is written to the result word register and cleared. At block 174 TEMPHIT is set to the value in NEWHIT, and control returns to block 150. This process repeats until, at block 150, it is determined that no additional hits reside in either word register one or word register two. At block 152, if TEMPHIT contains a valid hit, it is written to the result word register and the process completes. At the end of the process, a word register containing the hits from both word register one and word register two exists.

According to one embodiment of the present invention, relevance information is maintained to allow documents to be ranked according to importance. Relevance information is associated with each cluster, or hit. As discussed previously, relevance information can be either attribute relevance information or processing relevance information. Attribute relevance information is generated at the time documents are indexed, and include relevance associated with information such as whether the word is used in a title, is bolded, or other static information. Processing relevance information is generated when an operation is applied to a word register and includes, for example, proximity of words with respect to each other, or the count of words in a document. One aspect of the present invention combines relevance values associated with the hits relating to a document into a single document relevance number. Thus, when a result word register is returned, the document relevance number for each document in the result word register reflects a combination of the individual relevance values associated with the hits in that document. Hit level relevance is continually manipulated as shown, for example, at blocks 158 and 169 of FIG. 11, as an operation is applied to word registers.

The relevance calculations of the present invention are preferably self-normalizing. In other words, relevance values exist within a predetermined range and do not need to be normalized against other relevance values before they can be returned to a user. For example, relevance values can be maintained in a predetermined range between about 0 and about 100. Cumulative relevance values, that is relevance values created as a function of other relevance values, such as cluster relevance values or document level relevance values all exist in this predetermined range, and thus are independent of one another. Due to this self-normalizing feature, results can be returned 'piece-meal' from a search and immediately displayed to a user with a usable relevance value even though the search request is perhaps still awaiting results of the search from certain remote servers. In conventional searching engines, it is typically necessary to normalize the relevance values associated with matching documents. Consequently, results cannot be returned to a user until all of the results have been accumulated, and the relevance values have all been normalized. The present invention eliminates the need to normalize relevance values among documents because each relevance calculation is self-normalizing and maintains a relevance value in a predetermined range from about 0 to about 100.

Figure 12:
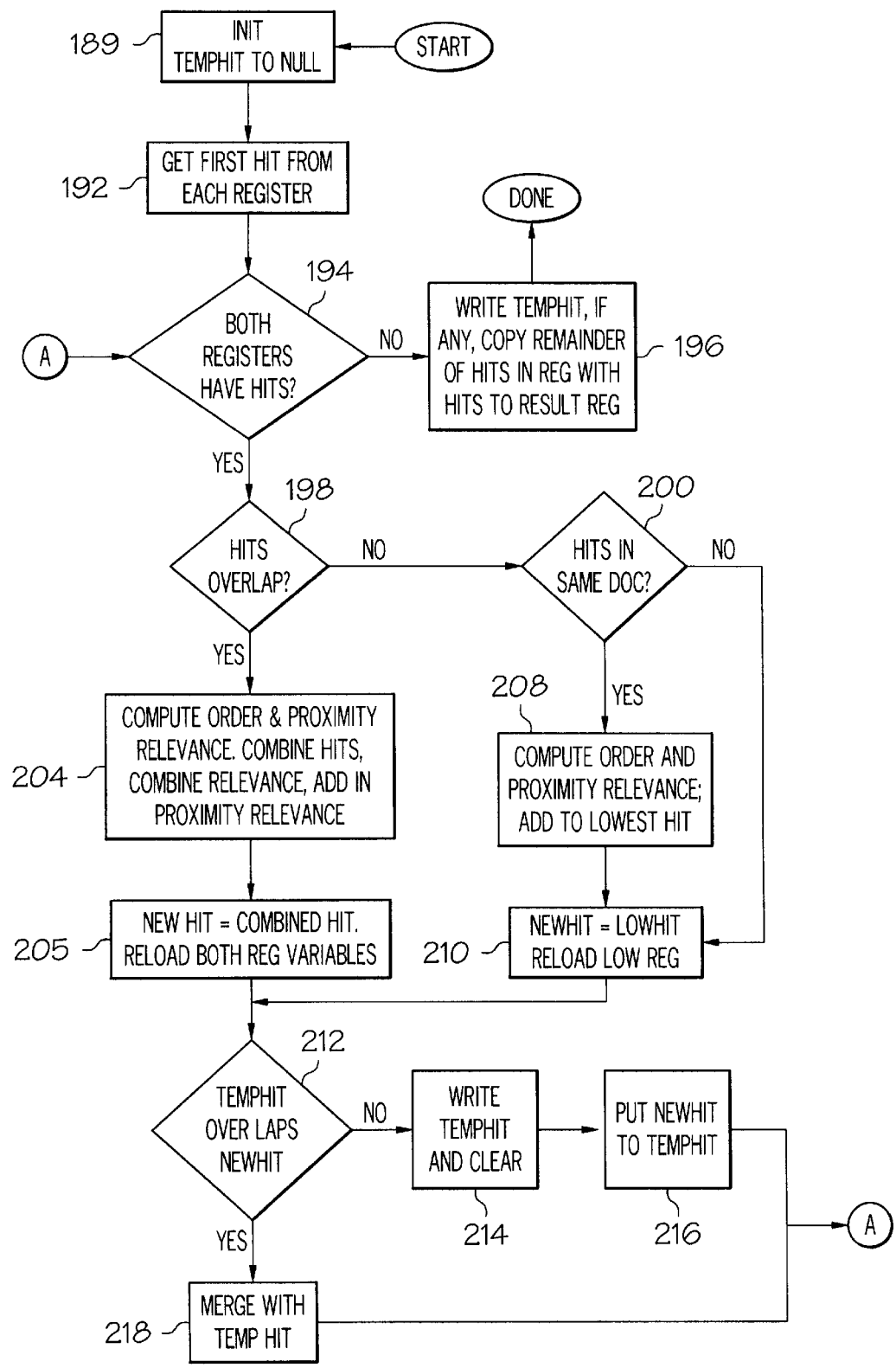
FIG. 12 is a flow diagram illustrating in greater detail steps for performing an OR operation against two word registers.

FIG. 12 is a flow diagram illustrating a process for combining two word registers into a result word register during an "OR" operation. At block 189, the variable TEMPHIT is set to NULL. At block 192 the first hit from each word register, if any, is obtained and loaded into a variable. At block 194 it is determined if each register contained a hit. If either register is empty, at block 196 the variable TEMPHIT is written to the result register if it is not NULL. The remaining hits in the register that contains any remaining hits is then written to the result register and the process is complete. If at block 194 both registers contained a valid hit, then at block 198 it is determined whether the hits overlap. As discussed with regard to FIG. 10, hits overlap if either hit contains a word number that falls within the range of word numbers contained in the other hit. If the hits do not overlap, then at block 200, it is determined whether the hits reside within the same document. This determination is made as discussed previously, such as by determining whether the hits reside within the minimum delta value of each other, if not, determining whether the hits hash to the same word number group, and if not accessing the boundary table to determine if the hits reside within the same document. If, at block 200, it is determined that the hits do not exist within the same document, then at block 210 the variable NEWHIT is loaded with the lowest hit of the two register variables. If at block 200, it is determined that the hits exist in the same document, then at block 208 the order and proximity relevance is calculated, and combined with the relevance associated with the lowest hit of the two register variables. At block 210, the variable NEWHIT is loaded with the lowest hit of the two register variables. If at block 198 it was determined that the two hits overlapped, then at block 204 the order and proximity relevance is calculated. The two hits are combined into a single hit, the relevance associated with the two individual hits are combined, and the proximity relevance is added to the relevance value. At block 205 the variable NEWHIT is loaded with the combined hit, and the variables associated with each register are loaded with the next hit from each of their respective word registers. At block 212 it is determined whether the variable TEMPHIT overlaps the variable NEWHIT. If so, at block 218 TEMPHIT and NEWHIT are combined into TEMPHIT and control branches to block 194. If not, TEMPHIT is written to the result register and cleared at block 214. At block 216 TEMPHIT is loaded with the value of NEWHIT and control returns to block 194. This process repeats until at block 194 it is determined that the hits associated with at least one register have been completely processed. At that point, control branches to block 196, processing occurs as described previously, and the process terminates.

Another example may be helpful for illustrating word register processing for a proximity search request. A proximity search request can be explicit, such as RED WITHIN 10 WORDS OF BLACK, or can be syntactic, such as "RED BLUE" AND "BLACK WHITE." In the latter search request, before the AND operator is performed, two implicit proximity operations will be performed, RED WITHIN 1 WORD OF BLUE, and BLACK WITHIN 1 WORD OF WHITE.

EXAMPLE 2

Search Request = "GREEN AND BLACK AND PURPLE ALL W/10 OF EACH OTHER"

WORDREG(GREEN)
   DOC REF LIST:
   WORD REF LIST:   3,x; 10,x; 1037,x; 1803,x
WORDREG(BLACK)
   DOC REF LIST:
   WORD REF LIST:   7,x; 1794,x; 1801,x
WORDREG(GREEN W/10 OF BLACK)
   DOC REF LIST:
   WORD REF LIST:   (3,7,10),x; (1794,1801,1803),x
WORDREG(PURPLE)
   DOC REF LIST:
   WORD REF LIST:   5,x; 1804,x
WORDREG((GREEN W/10 OF BLACK) W/10 PURPLE)
   DOC REF LIST:   1,x,3,10; 3,x,1794,1804
   WORD REF LIST:   (3,5,7,10),x; (1794,1801,1803,1804),x

Initially, the word reference lists for WORDREG (GREEN) and WORDREG (BLACK) are created with the wordset information from document table 36. Because the operation is a proximity operation, and the proximity determinations can be made from the word numbers without resort to document level information, it is not necessary to generate the document reference list. After WORDREG (GREEN) and WORDREG (BLACK) are generated, the proximity operation is applied. The word reference lists of WORDREG (GREEN) and WORDREG (BLACK) are analyzed to determine if the word numbers of one list is within ten of the word numbers of the other list. Since word numbers 3 and 10 from WORDREG (GREEN) are within ten of word number 7 of WORDREG (BLACK), these entries are entered into a new word reference list of the result word register WORDREG (GREEN W/10 BLACK). Because the word numbers are less than the minimum delta value of 32 from one another, they each exist within the same document, and no hashing, nor boundary table access is necessary. Similarly, the search engine determines that the word number 1037 in WORDREG (GREEN) is not within ten of any word number in WORDREG (BLACK). The search engine determines that the word number 1803 in WORDREG (GREEN) is within ten of word numbers 1794 and 1801 of WORDREG (BLACK). Because the difference between the word numbers 1794, 1801, and 1803 are less than the minimum delta value of 32, each of these words exist in the same document.

The word numbers that satisfy the proximity operation are grouped together as a cluster and are treated as a single unit in subsequent operations. This is indicated herein through the use of parentheses around the word numbers 3, 7, and 10 as well as the word numbers 1794, 1801, and 1803. As a cluster is formed, an algorithm is applied to the individual relevance numbers associated with each word number to create a single cluster relevance number. Thus, use of clusters eliminates the need to repeatedly determine whether word numbers exist within the same document, and also significantly reduces the overhead involved in maintaining relevance information. This becomes increasingly important for complex queries that result in many subqueries. A proximity operation is now applied between WORDREG (GREEN W/10 BLACK) and WORDREG (PURPLE). The search engine determines that word numbers 5 and 1804 in WORDREG (PURPLE) are within 10 of the word clusters in WORDREG (GREEN W/10 BLACK), and new clusters are formed in the final result word register, WORDREG ((GREEN W/10 BLACK) W/10 PURPLE). Up to this point it has not been necessary to generate document reference lists because all decisions were made at the word number level. However, before WORDREG ((GREEN W/10 BLACK) W/10 PURPLE) is returned, the results will be "pushed up" to document level, in the same manner as described previously with respect to the AND operation.

Another example illustrating an AND operation in conjunction with a proximity operation is illustrated below.

EXAMPLE 3

Search Request = "GREEN AND (BLACK W/10 PURPLE)"

WORDREG(GREEN)
    DOC REF LIST:    1,x,3,10; 2,x,1037,1037; 3,x,1803,1803
    WORD REF LIST:    3,x; 10,x; 1037,x; 1803,x
WORDREG(BLACK)
    DOC REF LIST:
    WORD REF LIST:    7,x; 1794,x; 1801,x
WORDREG(PURPLE)
    DOC REF LIST:
    WORD REF LIST:    5,x; 1804,x
WORDREG(BLACK W/10 PURPLE)
    DOC REF LIST:    1,x,5,7; 3,x,1794,1804
    WORD REF LIST:    (5,7),x; (1794,1801,1804),x
WORDREG(GREEN AND (BLACK W/10 PURPLE))
    DOC REF LIST:    1,x,3,10; 3,x,1794,1804
    WORD REF LIST:    3,x; (5,7),x; 10,x; (1794,1801,1803,1804),x

In Example 3, the word reference lists for WORDREG (GREEN), WORDREG (BLACK), and WORDREG (PURPLE) are initially created from wordsets in document table 36. A result word register WORDREG (BLACK W/10 PURPLE) is generated by applying a proximity operation between WORDREG (BLACK) and WORDREG (PURPLE) in the manner described previously in Example 2. Note that word clusters exist in WORDREG (BLACK W/10 PURPLE). Up to this point, it is not necessary to generate any document reference list information. WORDREG (BLACK W/10 PURPLE) will then be ANDed with WORDREG (GREEN) to generate the final word register WORDREG (GREEN AND (BLACK W/10 PURPLE)). Before applying the AND operation, it is necessary to generate the document reference list information in WORDREG (GREEN) because document reference list information is used in an AND operation. Similarly, the document reference list information in WORDREG (BLACK W/10 PURPLE) is generated in preparation for the AND operation between the two registers.

Initially, the document reference list of WORDREG (GREEN AND (BLACK W/10 PURPLE)) is generated, as described in Example 1, and then the word reference list information is generated by processing the word reference list information in WORDREG (BLACK W/10 PURPLE) and WORDREG (GREEN). As shown in the word reference list of WORDREG (GREEN AND (BLACK W/10 PURPLE)), the word reference list entries pertaining to document one contain two single word numbers, and a cluster of word numbers.

According to one embodiment of the present invention, clusters are formed only during proximity operations, and are not formed during 'AND' operations. However, an exception to this rule is made where an individual word number overlaps with a cluster. For example, in Example 3, the cluster '(1794, 1801, 1804)' overlaps with the word number '1803'. Thus, even though the final result word register was generated from an 'AND' operation, the word number 1803 was inserted into the cluster containing the word numbers 1794, 1801 and 1804.

Figure 13A:
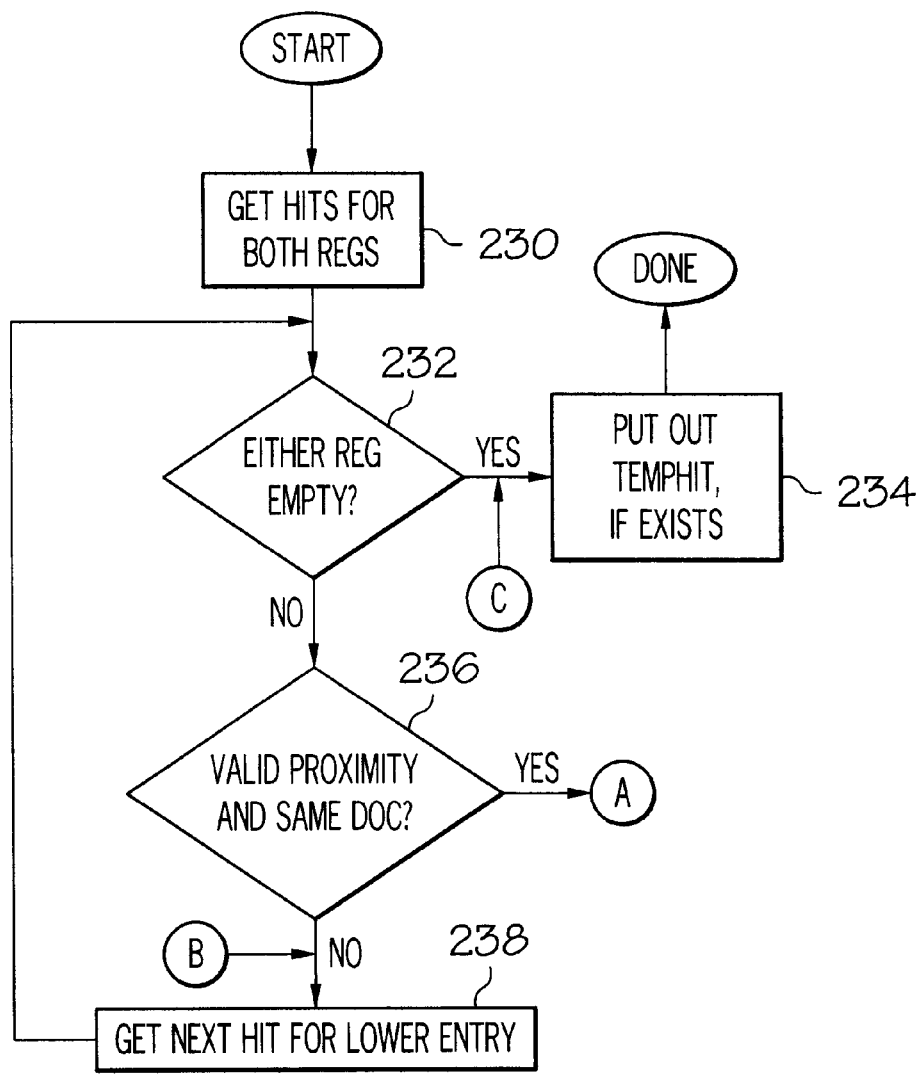
FIGS. 13a–13b are a flow diagram illustrating steps for performing a proximity operation against two word registers.
Figure 13B:
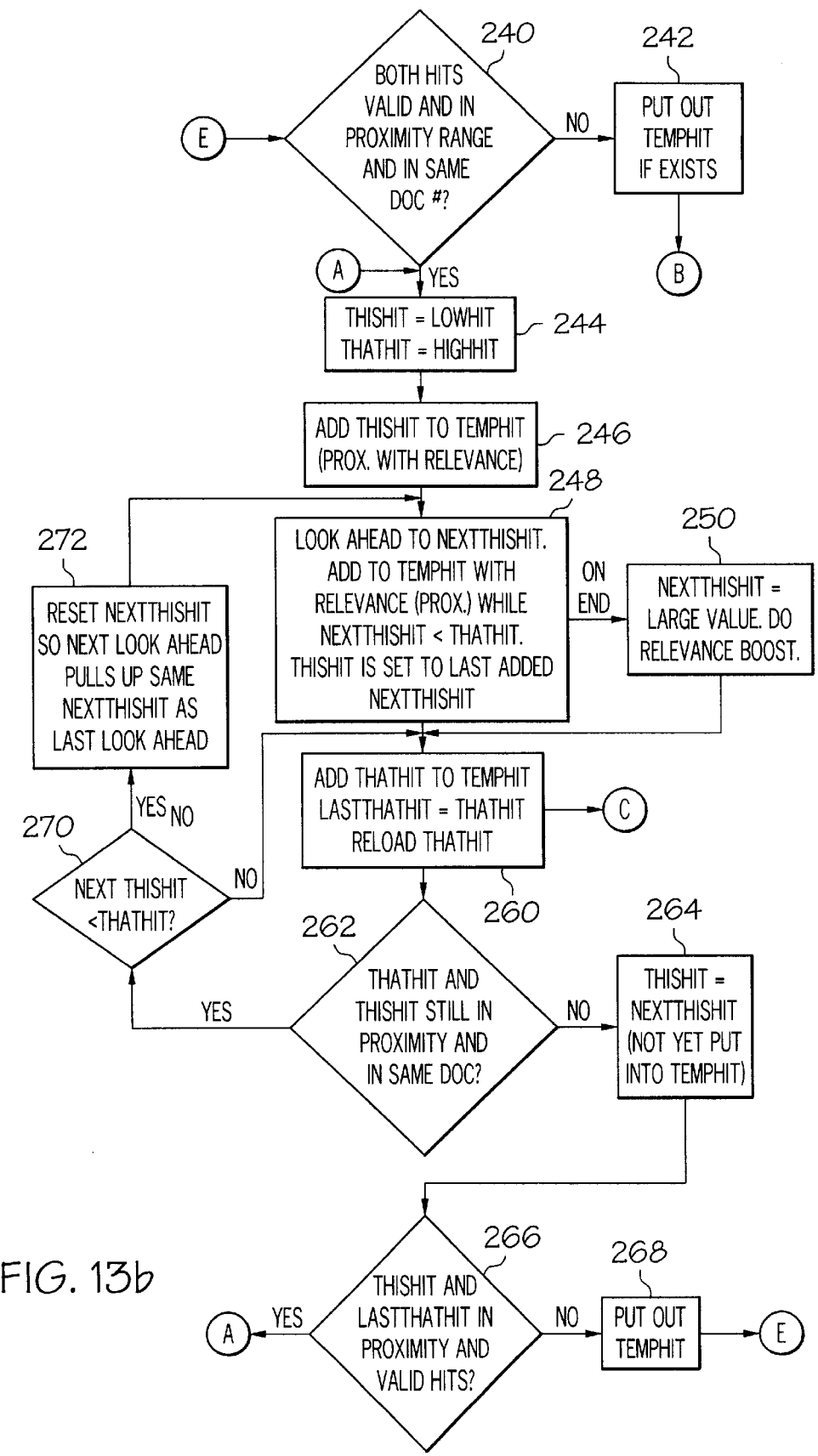

FIGS. 13a and 13b illustrate a process for combining hits from two word registers during a proximity operation. Referring to FIG. 13a, at block 230, a hit from each register is loaded into a variable associated with the respective register. At block 232 it is determined whether all the hits in either register have been processed. If so, then at block 234 the variable TEMPHIT, if not NULL, is written to the result register, and the process terminates. In the flow diagrams discussed herein, the variable TEMPHIT is cleared, i.e. set to NULL, after it is written. If, at block 232, both registers contained hits, then at block 236 it is determined whether the hits in both registers are within the proximity requirements set in the search request, and exist in the same document. Whether the hits reside in the same document can be determined as discussed previously, such as for example, determining if the hits are within the minimum delta value of each other, and if not hashing the word numbers to determine if they exist within the same word number group, and if not accessing the boundary table. If either of the conditions are not satisfied at block 236, then at block 238 hits are processed from the register associated with the lower of the two hits (lower word number) until a hit in the valid range is encountered, and control returns to block 232. If, at block 236, the hits are within the requested proximity and exist in the same document, control continues to block 244 of FIG. 13b.

Each of the two word registers contains one or more hits, sometimes referred to as a stream of hits. The hits are processed through the use of several pointers, THISHIT, THATHIT, NEXTTHISHIT, and LASTTHATHIT. A reference made herein to any of these pointers refers to the hit currently pointed to by the respective pointer. Each register contains an additional pointer to maintain the current point of processing for that register. Thus, register one has a pointer REG1HIT and register two has a pointer REG2HIT to maintain the location within the register of the current hit being processed. Thus, although not explicitly shown in FIG. 13, as THISHIT and THATHIT are incremented to the next hit, so are REG1HIT and REG2HIT. At block 244, THISHIT is set to the lowest of either REG1HIT or REG2HIT, and THATHIT is set to the highest of the two. At block 246, THISHIT is added to TEMPHIT. By adding, it is meant that the hit cluster pointed to by THISHIT is added, or merged, with the cluster, if any, that exists in the variable TEMPHIT. During the merge process the relevance value associated with the hit in THISHIT is combined with the relevance value associated with the hit in the variable TEMPHIT. At the end of the merge process, a single cluster will exist in TEMPHIT, along with a single relevance number associated with that cluster. The pointer NEXTTHISHIT increments through the hits in the register pointed to by THISHIT, ahead of the hit pointed to by THISHIT. At block 248, NEXTTHISHIT is added to TEMPHIT while NEXTTHISHIT is less than the hit pointed to by THATHIT. As each hit is processed, it is added to the variable TEMPHIT along with a relevance calculation. By 'added' it is meant that the hit is combined with the cluster in TEMPHIT. When NEXTTHISHIT is greater than THATHIT, THISHIT is loaded with the last value of NEXTTHISHIT that was less than the variable THATHIT. If, during the processing of hits in block 248 the end of the register was reached, the variable NEXTTHISHIT is set to a large value, such that it will be greater than THATHIT. At block 260 THATHIT is added to TEMPHIT. LASTTHATHIT is set equal to THATHIT. THATHIT is incremented to point to the next hit in the register word list. If, during the incrementing of THATHIT, the end of the word register is reached, control branches to block 234 of FIG. 13a.

At block 262 it is determined if THATHIT and THISHIT are in the specified proximity of each other and within the same document. If so, at block 270 it is determined whether NEXTTHISHIT is less than THATHIT. If not, control returns to block 260 and processing repeats as discussed previously. If at block 270, NEXTTHISHIT is less than THATHIT, then at block 272 NEXTTHISHIT is reset such that the look ahead at 248 will return the same value as it previously returned. If at block 262 either condition were false, then at block 264 THISHIT is set equal to NEXTTHISHIT. At block 266 it is determined if THISHIT and LASTTHATHIT are in proximity to one another and both contain valid hits. If so, control branches to block 244 and processing continues as discussed previously. If not, TEMPHIT is written out to the result word register at block 268, and control returns to block 240. At block 240, the next hits in each register are examined to determine if they are valid and in the document. If not, TEMPHIT is written to the result register and control returns to block 238 of FIG. 13a. If both conditions at block 240 are true, THISHIT is set to point to the lower of the two hits and THATHIT is set to the higher of the two hits at block 244. Processing repeats as discussed above.

Below, an example is provided illustrating the values of the various variables at various points relating to the flow diagram shown in FIG. 13, given a particular search request "FOREST W/5 TREE" and given that the word FOREST exists at word numbers 2, 3, 10, and 16, and the word TREE exists at word numbers 4, 5, 9, and 20.

---

REG1 (FOREST)  2, 3, 10, 16
REG2(TREE)    4, 5, 9, 20
Search Request = FOREST W/5 TREE
Block 230 (REG1HIT = 2, REG2HIT = 4)
Block 232 (NO)
Block 236 (YES)
Block 244 (THISHIT = 2, THATHIT = 4)
Block 248 (AT END; THISHIT = 3; NEXTTHISHIT = 10; TEMPHIT = 2, 3; REG1HIT = 3)
Block 260 (TEMPHIT = (2, 3, 4); LASTTHATHIT = 4; THATHIT = 5; REG2HIT = 5)
Block 262 (YES)
Block 270 (NO)
Block 260 (TEMPHIT = (2, 3, 4, 5); THATHIT = 9; LASTTHATHIT = 5)
    Block 262 (NO)
    Block 264 (THISHIT = 10; REG1HIT = 10)
    Block 266 (YES)
    Block 244 (REG1HIT = 10; REG2HIT = 9; THISHIT = 9; THATHIT = 10)
Block 246 (TEMPHIT = (2, 3, 4, 5, 9))
Block 248 (NEXTTHISHIT = 20)
Block 260 (TEMPHIT (2, 3, 4, 5, 9, 10); LASTTHATHIT = 10; THATHIT = 16)
Block 262 (NO)
Block 264 (THISHIT = 20)
Block 266 (NO)
Block 268 (RESULT WORD REGISTER = (2, 3, 4, 5, 9, 10); TEMPHIT = [CLEAR])
Block 240 (REG1HIT = 16; REG2HIT = 20; YES)
Block 244 (THISHIT = 16; THATHIT = 20)
Block 246 (TEMPHIT = (16))
Block 248 (THISHIT = 16; END OF REGISTER REACHED)
Block 250 (NEXTTHISHIT = 999)
Block 260 (TEMPHIT = (16, 20); LASTTHATHIT = 20; END OF REGISTER REACHED)
Block 234 (RESULT WORD REGISTER = (2, 3, 4, 5, 9, 10), (16, 20))

---

Figure 14A:
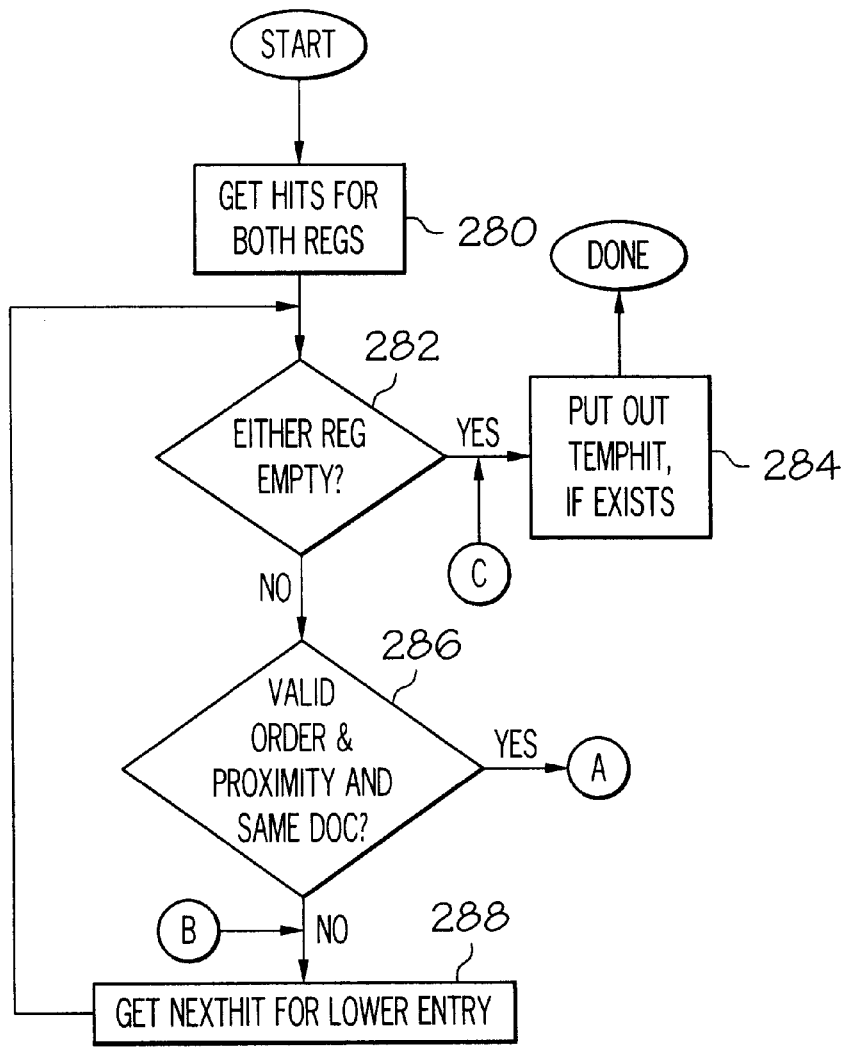
FIGS. 14a–14b are a flow diagram illustrating steps for performing an ordered proximity operation against two word registers.
Figure 14B:
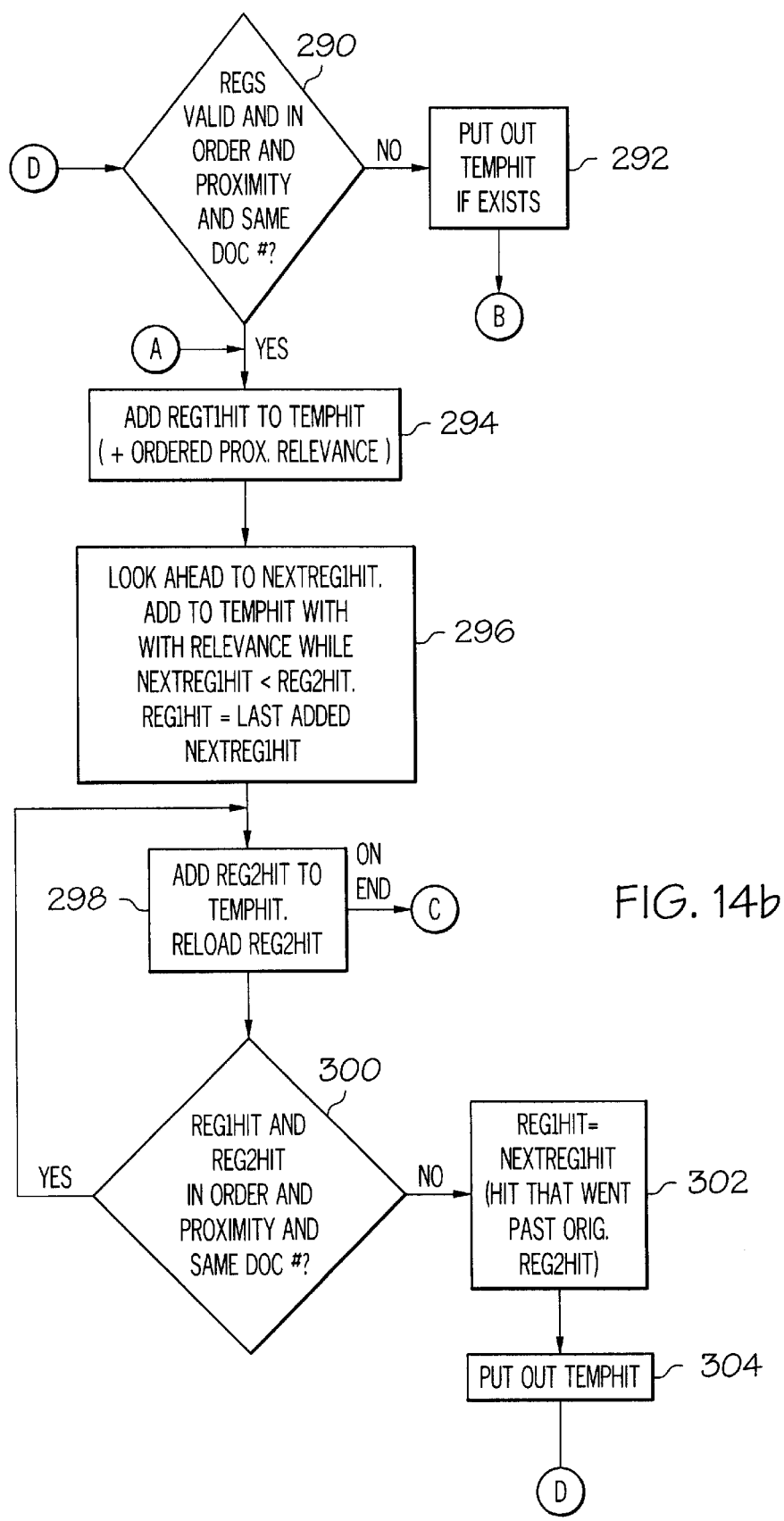

FIGS. 14a and 14b illustrate steps for performing ordered proximity operation. In an ordered proximity operation the order of the search words is important. At block 280, a hit from each word register is loaded into a variable associated with that register (REG1HIT and REG2HIT). If, at block 282, either register is empty (i.e., the register has been entirely processed), then at block 284 the variable TEMPHIT, if not NULL, is written out to the result word register and the process terminates. At block 286 it is determined whether REG1HIT and REG2HIT are in the requested order, proximity, and exist in the same document. If not, then at block 288 the hits are processed from the register associated with the lower of the two hits (lower word number) until a hit in the valid range is accessed. Control then returns to block 282. If at block 286 the hits were in proper order, proximity and within the same document, processing continues at block 294 of FIG. 14b. At block 294, REG1HIT is added to TEMPHIT. An ordered proximity relevance calculation is also applied to the new cluster in TEMPHIT. At block 296 NEXTREG1HIT is obtained and added to TEMPHIT as long as NEXTREG1HIT is less than REG2HIT. At the end of this loop, REG1HIT is loaded with the last NEXTREG1HIT that was added to TEMPHIT. At block 298 REG2HIT is added to TEMPHIT. REG2HIT is then loaded with the next hit from register two. If all hits in register two have been processed, control returns to block 284 of FIG. 14a. At block 300 it is determined whether REG1HIT and REG2HIT are in order, within the desired proximity, and in the same document. If so, processing returns to block 298. If not, at block 302, REG1HIT is set equal to the value of NEXTREG1HIT. At block 304 the variable TEMPHIT is written to the result word register and control returns to block 290. Processing repeats until the hits in each register have been completely processed.

Figure 15:
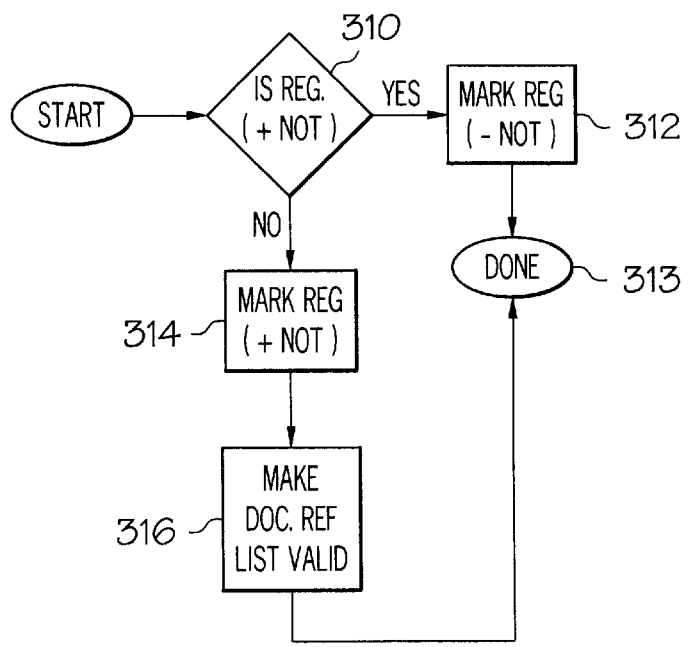
FIG. 15 is a flow diagram illustrating steps for performing a NOT operation against a word register.

FIG. 15 is a flow diagram illustrating steps for applying a NOT operation to a word register. Each word register according to one embodiment of the present invention has a flag used to indicate whether it has been marked as having a NOT operation applied to it. At block 310 it is determined whether the NOT flag has previously been set. If so, at block 312 the NOT flag is reset, essentially meaning that two NOTs have been applied to this register. Processing then terminates at block 313. If, at block 310, the NOT flag had not been set, then at block 314, the NOT flag is set. At block 316, the document reference list is made valid, if necessary, as discussed with regard to FIG. 10.

Figure 16:
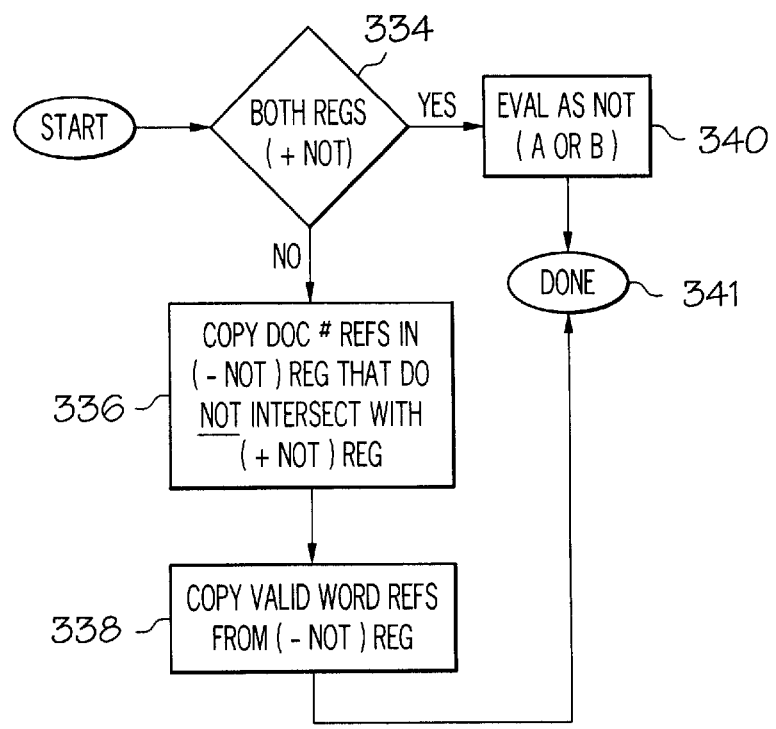
FIG. 16 is a flow diagram illustrating steps for performing an AND operation in conjunction with a NOT operation.

FIG. 16 is a flow diagram illustrating steps for applying an AND operation in conjunction with a NOT operation to two word registers. At block 334 if the NOT flag of both registers have been set, then at block 340 an OR operation is applied to the two word registers, and then a NOT operation is applied to the result word register. Processing terminates at block 341. If, at block 334 one of the word registers had not been marked as having a NOT operation applied to it, then at block 336 the document reference entries in the word register with the NOT flag reset that do not intersect with document reference entries in the word register with the NOT flag set are copied to the result word register. At block 338 the word reference list entries are created based on the document reference entries which were created in block 336. Processing terminates at block 341.

The foregoing description of preferred embodiments of the invention has been presented for purposes of illustration and description. It is not intended to be exhaustive or to limit the invention to the precise form disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for generating a full text index of a plurality of documents comprising:

associating at least one group of word numbers with the words of an indexed document, the indexed document having an initial word number and a final word number associated therewith, the group having a predetermined group size greater than one, the initial word number associated with any indexed document being at least a group size distance from an initial word number associated with another indexed document;

ensuring that a minimum delta value exists between a final word number associated with one indexed document and an initial word number associated with another indexed document;

generating a word list having a plurality of word entries, each word entry comprising a word and a list of word numbers associated with the word; and generating a cross-reference table containing a cross-reference entry for each group, each cross reference entry containing a reference to an indexed document with which the group has been associated.

2. A method according to claim 1, further comprising determining that a first word and a second word are contained in a same indexed document by passing the word number associated with the first word through a hash to generate a first hash value and passing the word number associated with the second word through the hash to generate a second hash value, and determining that the first hash value and the second hash value are equivalent.

3. A method according to claim 1, further comprising determining that a first word and a second word are contained in a same indexed document by determining that a numeric difference between the word number associated with the first word and the word number associated with the second word is less than the minimum delta.

4. A method according to claim 1, wherein the cross-reference table includes one or more entries for each indexed document, further comprising generating a boundary table containing a boundary entry for each entry in the cross-reference table, each said boundary entry indicating whether a corresponding entry in the cross-reference table is a first entry associated with a respective indexed document, or a subsequent entry associated with a respective indexed document.

5. A method according to claim 1, further comprising using a word register to maintain word information about a search word in a search request, the word register including a register document list and a register word list, the register word list being operative to contain a list of word numbers associated with the search word in the indexed documents, and the register document list being operative to contain a list of references to the indexed documents containing the search word and a lowest and highest word number contained in the register word list for each respective reference.

6. A method according to claim 5, wherein the word register further comprises a word number relevance list that is operative to contain a list of relevance numbers, each relevance number corresponding to a respective word number in the register word list.

7. A method according to claim 6, wherein the word register further comprises a document relevance list, the document relevance list being operative to contain a list of relevance numbers, each relevance number corresponding to a respective reference in the register document list.

8. A method according to claim 7, wherein a relevance number contained in the document relevance list corresponds to a respective reference in the register document list and is created as a function of the relevance numbers in the word number relevance list that are associated with word numbers associated with the respective reference.

9. A method according to claim 6, further comprising generating a result word register as a function of a first and second word register, the word number relevance list of the result word register being derived as a function of the relevance numbers in the first and second word registers, each relevance number in the word number relevance list of the result word register corresponding to a respective word number in the register word list of the result word register.

10. A method according to claim 9, further comprising delaying the generation of the register document list of the result register until after the generation of the register word list of the result register.

11. A method according to claim 10, wherein the generation of the register document list is delayed until a document level operation must be carried out.

12. A method according to claim 5, further comprising maintaining a plurality of word numbers in a word cluster, each word cluster being derived from a plurality of word numbers, and having a word cluster relevance number associated therewith, the word cluster relevance number being derived as a function of the individual relevance numbers associated with the words in the cluster.

13. A method according to claim 5, wherein each word cluster relevance number is in a range of about 0 to about 100.

14. A method for generating a full text index of a plurality of documents, comprising:

associating a word number with each word in a plurality of documents, each document having associated therewith an initial word number and a final word number, the initial word number associated with each document being at least a predetermined increment from an initial word number associated with another document, the predetermined increment being greater than one;

providing a minimum inter-document word number delta between a word number in one document and a word number in another document;

generating a word list containing words and the word numbers associated with the respective word; and generating a document cross-reference table associating word numbers with a respective document.

15. A method according to claim 14, further comprising determining if a first word and a second word are located in a same document by determining that an absolute difference between the word number associated with the first word and the word number associated with the second word is less than the minimum inter-document word number delta.

16. A method according to claim 14, further comprising generating a boundary table having a boundary entry corresponding to each cross reference entry, each boundary entry indicating whether the corresponding cross reference entry is the first cross reference entry associated with a document.

17. A full text index, comprising:

a word table being operative to contain a plurality of lists of word numbers, the word numbers being associated with words in a plurality of indexed documents, each indexed document having at least one group of word numbers associated therewith and having a first word number and a last word number, each group having a uniform size greater than one, and the first word number of any document being at least the uniform size away from the first word number of any other document, wherein a minimum delta exists between a final word number associated with an indexed document and an initial word number associated with any other indexed document; and a cross-reference table comprising a reference entry corresponding to each group of word numbers and containing a reference to an indexed document to which the group of word numbers is associated.

18. A full text index according to claim 17, further comprising a border table containing a border entry corresponding to each reference entry in the cross-reference table, each border entry being operative to indicate whether the word numbers associated with the reference entry are a first group of word numbers associated with an indexed document.

19. A full text index according to claim 17, wherein the word table contains a plurality of separate lists for at least one word, each separate list containing word numbers of words having a common attribute.

* * * * *